(12) United States Patent
Aijaz et al.

(10) Patent No.: US 11,758,597 B2
(45) Date of Patent: Sep. 12, 2023

(54) SYSTEM AND METHOD FOR OPTIMIZING WIRELESS COVERAGE IN INFRASTRUCTURE-LESS LOGISTICS AND WAREHOUSING OPERATIONS

(71) Applicant: Kabushiki Kaisha Toshiba, Tokyo (JP)

(72) Inventors: Adnan Aijaz, Bristol (GB); Anthony Portelli, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 154 days.

(21) Appl. No.: 17/333,360

(22) Filed: May 28, 2021

(65) Prior Publication Data

US 2022/0386395 A1 Dec. 1, 2022

(51) Int. Cl.
*H04W 76/14* (2018.01)
*H04W 84/18* (2009.01)
*H04W 64/00* (2009.01)
*H04B 17/318* (2015.01)
*G06V 20/10* (2022.01)

(52) U.S. Cl.
CPC .......... *H04W 76/14* (2018.02); *H04B 17/318* (2015.01); *H04W 64/006* (2013.01); *H04W 84/18* (2013.01); *G06V 20/10* (2022.01)

(58) Field of Classification Search
CPC ....... H04W 84/18; H04W 4/029; H04W 4/38; H04W 24/02; H04W 4/023; H04W 24/08; H04W 4/025; H04W 64/003; H04W 4/024; H04W 24/10; H04W 64/00; H04W 8/24; H04W 88/02; H04W 16/14; H04W 92/18; H04W 4/14

See application file for complete search history.

(56) References Cited

U.S. PATENT DOCUMENTS

| | | | |
|---|---|---|---|
| 7,873,469 B2 | 1/2011 | D'Andrea et al. | |
| 2018/0139152 A1* | 5/2018 | Shaw | H04W 84/18 |
| 2018/0276607 A1 | 9/2018 | Stadie et al. | |

* cited by examiner

*Primary Examiner* — Kwasi Karikari
(74) *Attorney, Agent, or Firm* — Oblon, McClelland, Maier & Neustadt, L.L.P.

(57) ABSTRACT

A method for optimizing coverage of a wireless network of a plurality of mobile robots in an environment in which each robot includes an optical sensor module, a microprocessor, and a wireless communication module. The method includes: receiving, by a first robot in the network, signals from a second robot in the network; determining, by the first robot based on the signals, that the first robot or second robot do not fulfil a network coverage condition; selecting, by the first robot, at least two landmarks in the environment; and performing, by the first robot, a movement based on an angle between the two landmarks with respect to the first robot, to improve the network coverage condition.

18 Claims, 19 Drawing Sheets

SYSTEM AND METHOD FOR OPTIMIZING WIRELESS COVERAGE IN INFRASTRUCTURE-LESS LOGISTICS AND WAREHOUSING OPERATIONS

FIELD

Embodiments described herein relate generally to a method and system of optimising wireless coverage in locations lacking infrastructure.

BACKGROUND

Mobile robotics systems for automation in warehousing and logistics is a growing industry segment. Mobile robotics systems are often purpose-built for the environment they work in. This requires necessary infrastructure for the system to operate smoothly and efficiently. The material handling industry is rapidly evolving with increased penetration of mobile robotics systems in logistics facilities with little or no infrastructure. Notable examples include loading/unloading of delivery trucks, goods-to-person delivery systems in retail/construction/healthcare, baggage storage and retrieval systems, and cargo transport at airports. In such ad-hoc environments, out-of-box low-cost robotics solutions are desirable for flexible operation. A team of small low-cost robots operating in a cooperative manner provides a viable solution. However, such ad-hoc environments are characterized by no global communication/connectivity infrastructure. Installing sufficient infrastructure to provide global coverage is a high capital expenditure.

A fundamental challenge in realizing material handling operations using mobile robots with no global communication infrastructure is to maintain full network connectivity under movement constraints. A wireless mesh network of mobile robots is an attractive solution to address this challenge. However, such a wireless mesh network must have the capability of self-deployment without centralized coordination or complex motion planning under global network state. It must be able to react/adapt to uncertain situations. It also needs to handle versatile service requirements of material handling operations. Coverage optimization of such a wireless mesh network of mobile robots is particularly important for efficient delivery of automation tasks while maintaining complete network connectivity.

Arrangements of the present invention will be understood and appreciated more fully from the following detailed description, made by way of example only and taken in conjunction with drawings in which.

DETAILED DESCRIPTION

Figure 1:
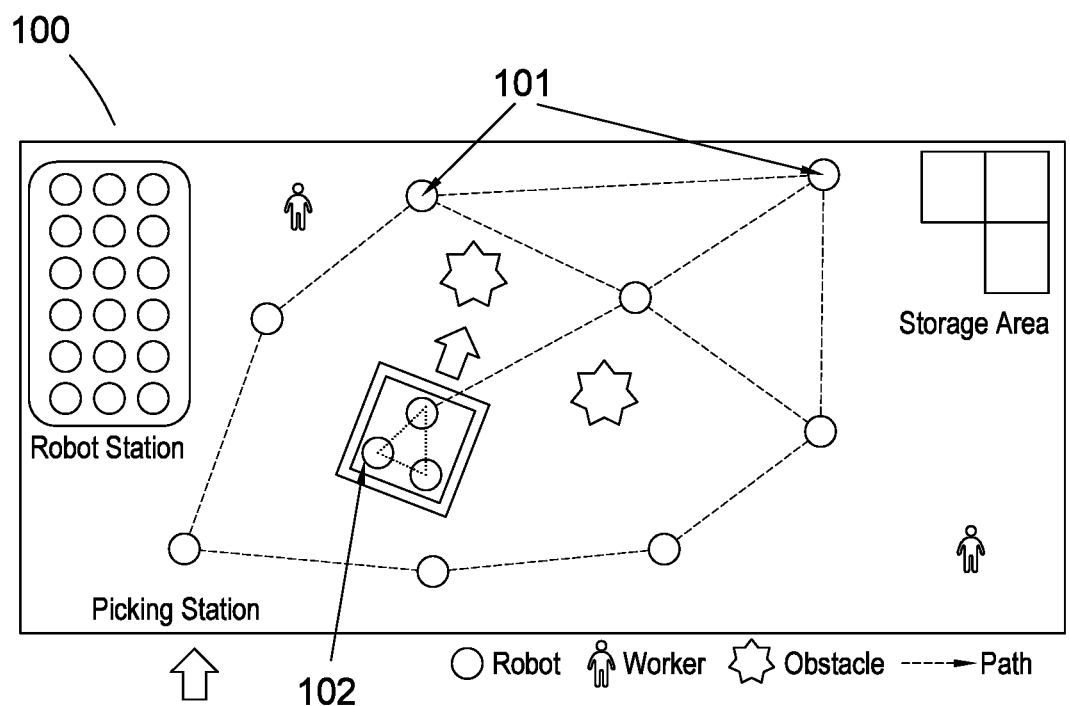
FIG. 1 illustrates a proactive mode of operation according to an embodiment.

In accordance with a first aspect of the invention, there is provided a method for optimizing coverage of a wireless network of a plurality of mobile robots in an environment, wherein each robot comprises an optical sensor module, a microprocessor and a wireless communication module, the method comprising: receiving, by a first robot in the network, signals from a second robot in the network; determining, by the first robot based on the signals, that the first robot or second robot do not fulfil a network coverage condition; selecting, by the first robot, at least two landmarks in the environment; and performing, by the first robot, a movement based on an angle between the two landmarks with respect to the first robot, so as to improve the network coverage condition.

The angle is the angle formed by the intersection of two lines. The first line passing through a first landmark of the at least two landmarks and the first robot. The second line passing through the first robot and a second landmark of the at least two landmarks.

In an embodiment, the movement is along a motion vector, wherein the direction of the motion vector lies on a bisector of the angle between the at least two landmarks with respect to the first robot.

In an embodiment, a magnitude of the motion vector is based on a mapping between signal strength and distance.

In an embodiment, the at least two landmarks comprise the second robot and a reference robot.

In an embodiment, each robot comprises a camera.

In an embodiment, the method further comprises, prior to performing the movement, sending, by the first robot, a movement message to the robots in the network, the message including information on the at least two landmarks; and if the second robot or a reference robot is one of the at least two landmarks, maintaining, by the second robot or the reference robot, its position, until the movement is complete.

In an embodiment, the network coverage condition comprises a connectivity condition, wherein the connectivity condition requires that an average strength of signals received by each robot in the network from neighbouring robots of that robot is above a threshold value, wherein the signals comprise connectivity information, the method further comprising: determining, by the first robot based on the connectivity information, that the second robot does not meet the connectivity condition with at least one neighbouring robot of the second robot; and performing, by the first robot, the movement based on the angle between the two landmarks with respect to the first robot, so as to improve the connectivity condition for the second robot while ensuring that the first robot meets the connectivity condition with neighbouring robots of the first robot.

In an embodiment, the angle is the smallest angle between the two landmarks with respect to the first robot. In an embodiment, the angle is the angular separation between the two landmarks with respect to the first robot.

In an embodiment, the method further comprises receiving, by the second robot, beacons from the at least one neighbouring robot; determining, by the second robot, if it is in a critical connectivity state based on the strength of the received signals; and sending by the second robot, the information regarding the critical connectivity state.

In an embodiment, the connectivity information from the second robot comprises neighbourhood information from the second robot.

In an embodiment, the method further comprises wherein if the second robot is not directly visible to a camera of the first robot, then determining, by the first robot, a third robot as a reference robot, wherein the second robot is visible to the third robot; receiving, by the first robot, from the third robot bearing information of the second robot, wherein the bearing information refers to a direction of the second robot in a frame of reference of the third robot; determining relative orientation information between the first robot and the third robot; and selecting landmarks based on the bearing information and the relative orientation information.

In an embodiment, wherein the robot comprises a camera, the method further comprises: if a marker of the third robot is visible to the camera of the first robot, computing, by the first robot, the relative orientation information; and if a marker of the third robot is not visible to the camera of the first robot, requesting, by the first robot relative orientation information from the third robot.

In an embodiment, the method further comprises: sending, by the first robot, a message to all other robots to determine if the target robot is visible to any of the neighbouring robots.

In an embodiment, the network coverage condition comprises a stability condition, the method further comprises: determining, by the first robot, that a number of neighbouring robots of the first robot is greater than a threshold number; computing, by the first robot, a visual angle that includes all robots in a 360° field of view of the robot; and if the visual angle is less than a threshold value, performing by the first robot coverage movement based on the angle between the two landmarks within the environment, so as to reduce the number of neighbouring robots and to increase coverage of the network of robots.

In an embodiment, if the angle in radians is denoted θ, then the movement is based on 2*pi (radians)−θ.

In an embodiment, the method further comprises, selecting, by the first robot, a reference robot to use as one of the at least two landmarks from the neighbouring robots of the first robot, wherein the reference robot is selected based on the signal strength of signals received by the first robot from the reference robot.

According to a second aspect of the invention there is provided a method of maintaining wireless connection for a formation comprising robots of the plurality of the mobile robots and a leader robot from the plurality of robots, the formation configured to move an item in the environment, the method comprising: determining, by a follower robot, in the environment, connectivity to a gateway node, wherein the follower robot is not comprised in the formation; providing, by the follower, connectivity updates to the leader robot; if a connectivity condition is satisfied initiating, by the leader robot, movement of the formation of robots towards a destination; if the connectivity condition is not satisfied, performing by a neighbouring robot of the follower robot, the method of claim 1; wherein the connectivity condition is not satisfied if the leader robot does not receive connectivity updates from the follower robot over a predetermined period.

In an embodiment, the method further comprises: following, by the follower robot, the formation.

In an embodiment, the method further comprises receiving by the leader robot a critical connectivity message or a movement constraint message from the follower robot; and recruiting, by the follower robot, a second follower robot, the second follower robot having a connection with the gateway node.

In an embodiment, the second follower robot has a connection with the gateway node that is above a signal strength threshold.

According to a third of the invention there is provided a robot comprising an optical sensor module, a microprocessor and a wireless communication module, the robot configured to perform the method described above.

FIG. 1 illustrates a team of mobile robots 101 within an environment 100 according to an embodiment. Each robot has sensing, computation and communication modules. The robots acquire observation-based (e.g., visual sensing aided by camera) or communication-based (i.e., wireless connectivity) information. Each robot can also be identified by a unique ID (that is transmitted in communication exchange) and/or a coloured marker placed along its translational axes. The robots may form a formation 102 to move an item within the environment.

The team of robots 101 are arranged as a mesh (ad-hoc) network, with each robot forming a node of the network. The terms node and robot are used interchangeably in the following description.

Figure 2:
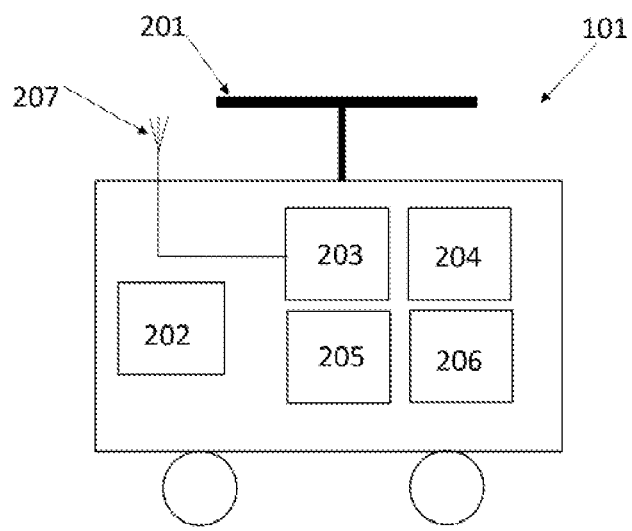
FIG. 2 illustrates a robot according to an embodiment.

FIG. 2 illustrates a robot 101 according to an embodiment. Each robot 101 has a driving means 202 such as a holonomic drive and a means for engaging with the item to be moved 201, for example a fixed lifting platform on its top surface. The driving means 202 controls the movement of the robot 101, for example, as it moves around the environment.

Each robot 101 further comprises a wireless input/output port 203 connected to an antenna 207 to transmit and receive signals. The input/output port 203 is communicatively connected to the antenna 207. The input/output port 203 is configured to transmit and receive radio signals, preferably short-range radio communication signals. The robot 103 may receive a signal from another robot in the environment. The robot 103 may transmit a signal to another robot in the environment, or globally broadcast it to all the robots in the environment.

Each robot 101 further comprises a microprocessor 204 coupled to non-volatile memory 205. The microprocessor 204 is configured to execute instructions received from another robot. The microprocessor 204 is also configured to execute instructions stored in the non-volatile memory 205. Execution of these instructions causes the robot 101 to perform some of the method steps described herein. For example, execution of the instructions may cause a control module 206 in conjunction with the holonomic drive 202 to move the robot 101 in the environment 100.

Whilst in FIG. 2 only one antenna is connected to the input/output port 203, it is emphasized that the input/output port 203 may be communicatively coupled to more than one antenna.

The systems and methods presented below provide coverage optimization in two different modes of operation: a proactive mode and a reactive mode.

Proactive Mode

FIG. 1 illustrates the proactive mode of operation. In FIG. 1, a group of mobile robots 101 deploys itself so as to maximize the overall area coverage in a logistic facility. The deployment can be subject to some connectivity constraints such as a minimum number of neighbours per each robot or per each robotic formation.

Coverage Optimization Problem $\mathcal{N}_R$ denotes the set of the total number of robots in the network. The coverage optimization problem is formulated as follows.

$$\max_{Q} C(Q) = \bigcup_{i \in \mathcal{N}_R} A_i(q_i) \quad (1)$$

$$\text{subject to } (i) \, \alpha_{min} \leq |\mathcal{N}_i| \leq \alpha_{max} \, \forall \, i \in \mathcal{N}_R$$

where C(Q) is the overall coverage area given the positions Q (in 2D space) of the robots. The overall coverage is the union of the coverage area of each robot i∈ $\mathcal{N}_R$ at its position $q_i$, i.e., $A_i(q_i)$. Further, $\mathcal{N}_i$ is the set of the neighbors for the $i^{th}$ robot. The objective of the proactive mode is to maximize the overall coverage while ensuring a minimum ($\alpha_{min}$) and maximum ($\alpha_{max}$) number of neigbors for the $i^{th}$ robot for maintaining robust connectivity. Low-complexity heuristic algorithms are proposed for the coverage optimization problem.

Coverage optimization is achieved over two distinct phases for any robot in the network—the measurement phase and the movement phase.

In the measurement phase, a robot collects neighbourhood information (information regarding other robots) to have a local estimate of coverage. It also broadcasts information for assisting neighbouring robots to estimate coverage. In some embodiments, this is realized through distributed multi-hop wireless mesh connectivity among robots based on Bluetooth mesh protocol. The Bluetooth mesh protocol provides several advantages for mobile robotics systems as compared to other state-of-the-art mesh protocols.

In the movement phase, a robot performs independent movement to optimize coverage and/or connectivity based on the measurement phase.

Figure 3A:
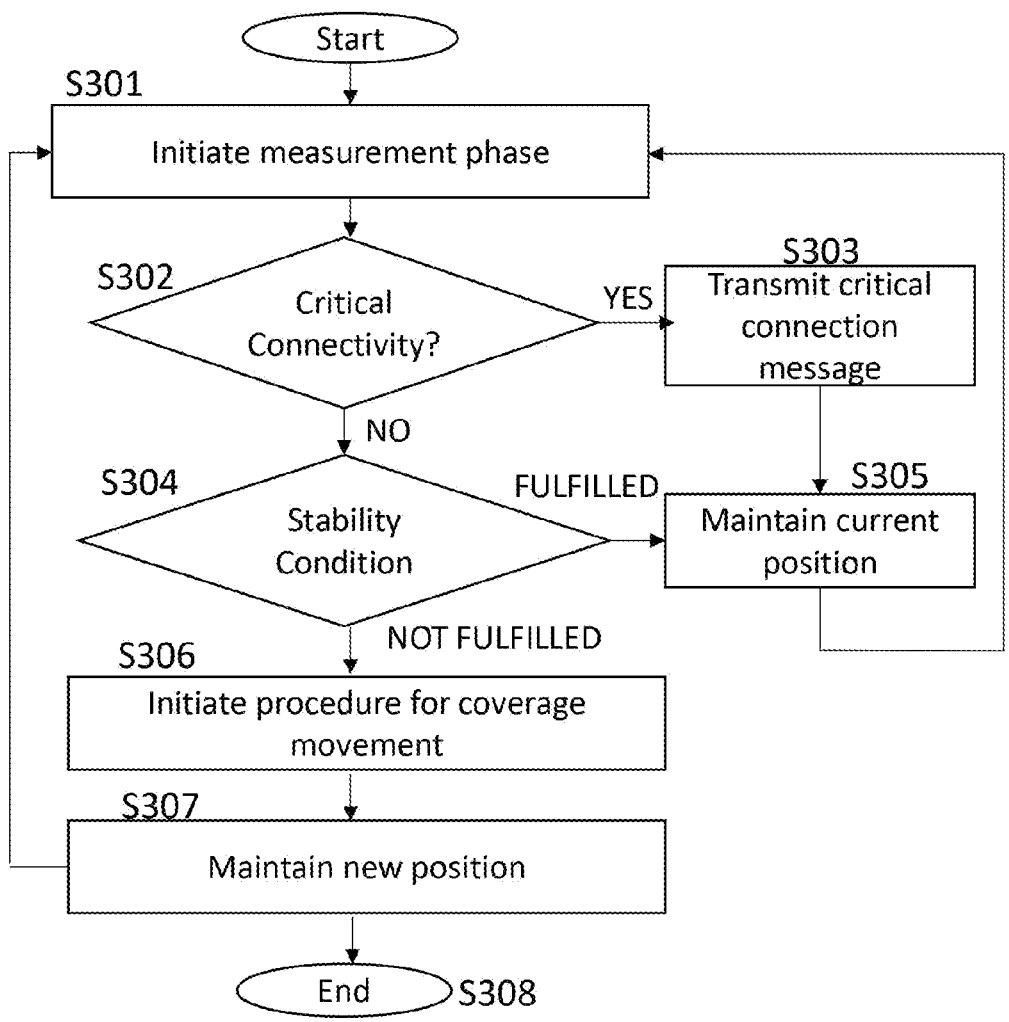
FIG. 3a is a flowchart detailing a method according to an embodiment.

FIG. 3a illustrates a high-level flow chart for operation of the proactive mode. Note that the phases of different robots are neither synchronized in time nor of fixed duration. In S301, the measurement phase is initiated by the robot. The robot 101 determines if it is in a critical connectivity state (S302), and if so, it transmits a critical connection message to the team of robots 101 (S303). It then maintains its current position (S305).

If the robot is not in a critical connectivity states then it checks whether it fulfils a stability condition (S304). The stability condition is that the robot 101 has a number of neighbouring nodes $\alpha_{min} \leq |\mathcal{N}_i| \leq \alpha_{max}$. If the stability condition is fulfilled, the robot 101 maintains its current position (S305). If it does not fulfil the stability condition, it initiates a movement to improvement coverage, and hence ensure that the robot fulfils the stability condition.

Figure 3B:
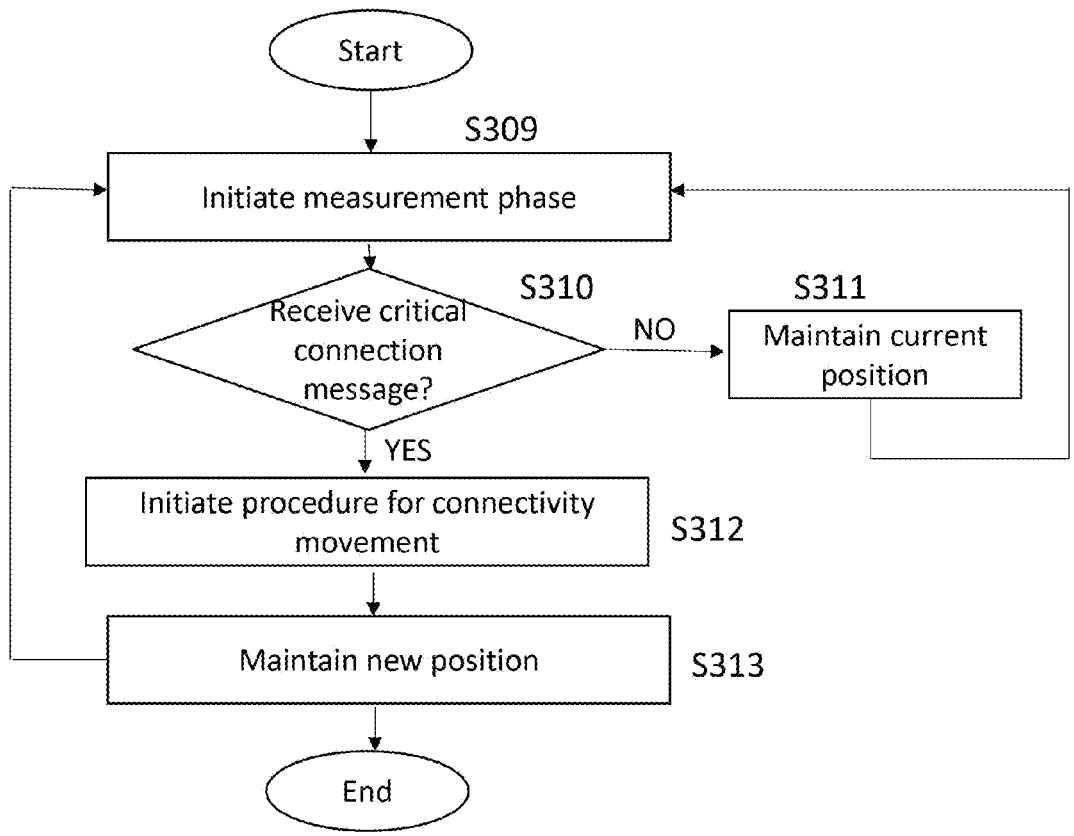
FIG. 3b is a flowchart detailing a method according to an embodiment.

In FIG. 3b, if the robot 101 receives a critical connection message (S310), then it initiates a procedure for connectivity movement (S312).

Measurement Phase

The measurement phase comprises an advertising phase and a scanning phase. During the measurement phase, a node (or robot) iterates between advertising and scanning phases. During an advertising phase, a node (or robot) transmits beacons in one or more advertising events.

Figure 4:
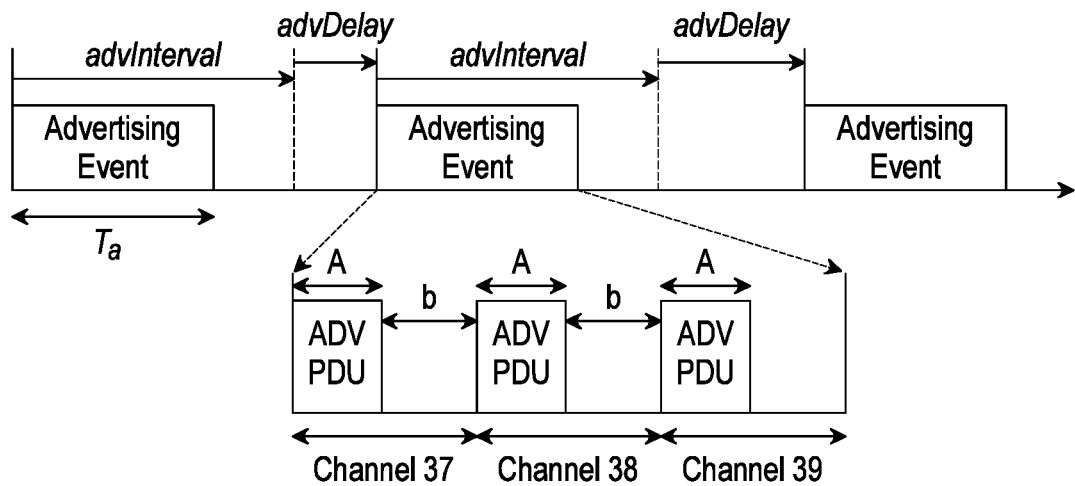
FIG. 4 illustrates an advertising procedure in Bluetooth mesh protocol.
Figure 5:
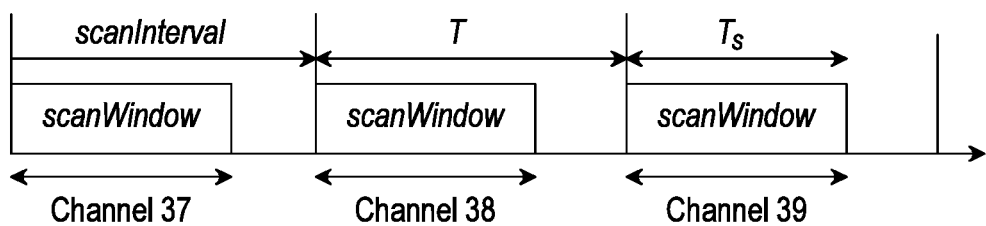
FIG. 5 illustrates a scanning procedure in Bluetooth mesh protocol.

Each advertising event comprises three different transmissions, each on an advertising channel. During scanning phase, a node (or robot) scans the advertising channels to acquire neighbourhood information. FIG. 4 and FIG. 5 illustrate the advertising and scanning procedures, respectively.

FIG. 4 illustrates the advertising procedure according to an embodiment. The Bluetooth mesh profile builds on broadcasting of data over three Bluetooth Low-Energy (BLE) advertising channels. A source node (robot) 101 injects its message into the mesh network through the advertising process, which entails transmitting messages in three advertising channels (37, 38, 39). An advertising event is defined as a cycle of advertising operations where mesh protocol data units (PDUs) are sent in sequence over each of the three advertising channels. The network layer can configure multiple advertising events to improve the reliability of message injection into the mesh network. The duration between two consecutive advertising events is variable in nature and consists of a fixed advInterval and a pseudo-random advDelay. The relay nodes (robots) in the mesh network periodically scan the advertising channels and listen to the advertising information of the neighbouring nodes.

FIG. 5 illustrates the scanning procedure according to an embodiment. A relay node (robot) scans a different advertising channel every scanInterval (T) for a duration of scan Window ($T_s$). The initial advertising channel to scan on is selected randomly (from the three advertising channels) and all channels are scanned periodically.

The robust measurement phase ensures that a pair of nodes (robots) are mutually and consistently connected.

During the measurement phase each node (robot) 101 iterates between advertising and scanning phases. The duration between advertising and scanning phases is randomly chosen. During the scanning phase, a node scans for beacons from neighbouring nodes. These beacons are used as an indicator of received power (RSSI). To ensure mutual connectivity, a node piggybacks the received RSSI from a node (robot) on the transmitted beacon along with the ID of the node.

In an embodiment, to mitigate the impact of sporadic connectivity, a node maintains a moving average of the RSSI information over a certain number of received beacons or scanning phases.

A robot U confirms another robot V as a neighbour if two conditions are satisfied:

Condition 1: If U overhears beacons from V such that the average (downlink) RSSI is above a certain threshold Downlink_RSSI_Thresh.

Condition 2: If U receives beacon transmissions from V indicating that U is overheard by V and such that the average (uplink) RSSI is above a certain threshold Uplink_RSSI_Thresh.

Figure 6:
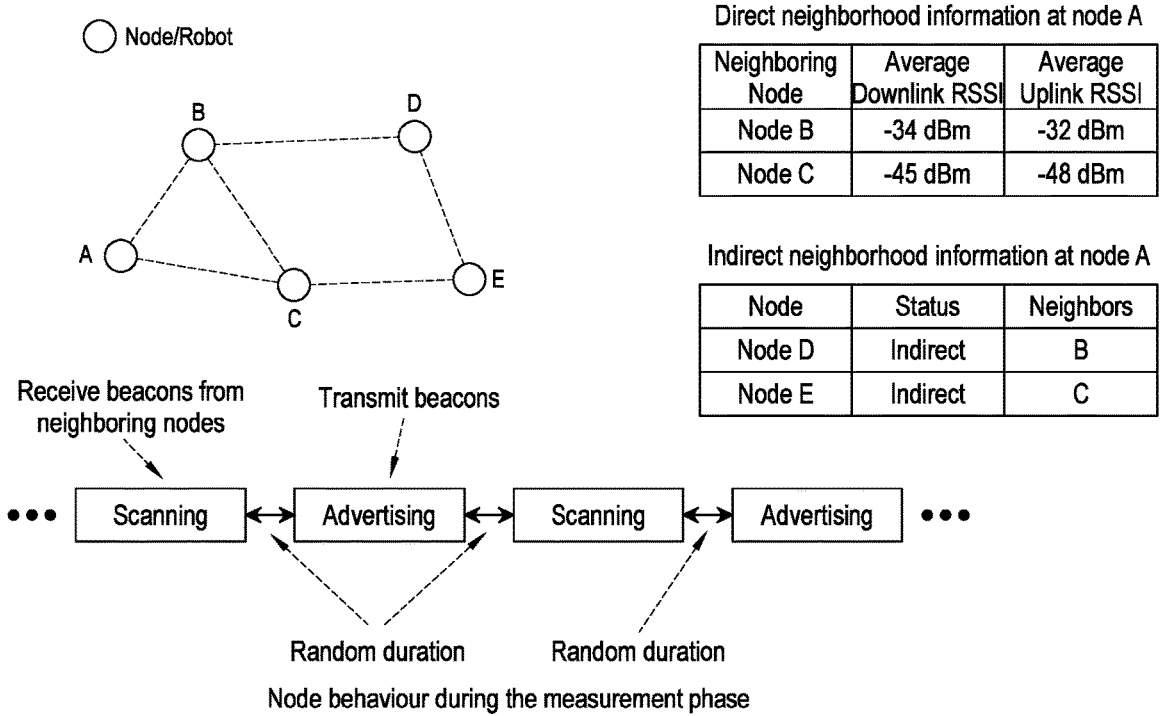
FIG. 6 illustrates a measurement phase according to an embodiment.

FIG. 6 illustrates the neighbourhood information that is maintained at a node (robot). For example, node A can directly receive beacons from nodes B and C. In addition to maintaining information about directly connected nodes, a node maintains information about indirectly nodes. Such information is received by overhearing information from neighbouring nodes during the scanning phase. For example, a beacon transmitted by node B, indicating direct reception of beacons from node E, would indicate to node A that node E is indirectly connected via node B.

Based on the neighbourhood information, a node determines whether it fulfils the stability condition which implies that a node maintains its current position if it has a N_Stable number of neighbouring nodes.

Figure 7:
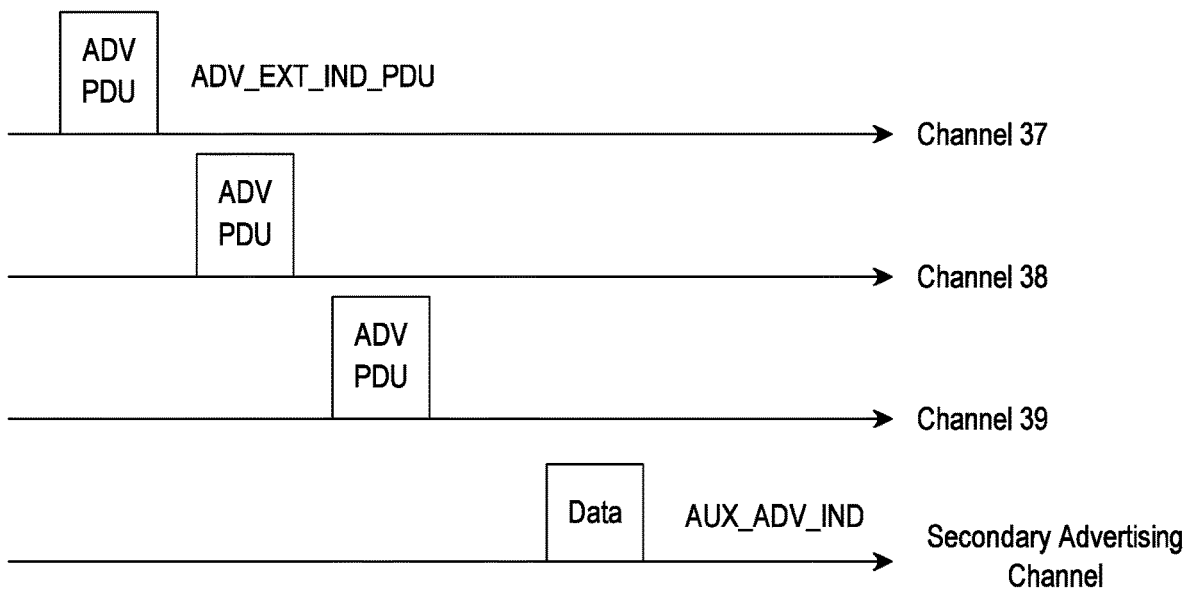
FIG. 7 illustrates extended advertisements in Bluetooth mesh protocol.

As illustrated in FIG. 7, the measurement phase can also leverage extended advertisements wherein the data transmissions take place over secondary control channels. With extended advertisements, a node sends short extended advertising indications in the three legacy advertising channels, also known as primary advertising channels. The extended advertising indication includes a pointer to a secondary advertising channel, which is chosen from the remaining channels available to the robot. The scanner should switch to the secondary advertising channel to receive the data payload. The data payload is sent in an auxiliary advertisement packet sent over the secondary advertising channel after the advertising event on the primary advertising channels is finished. Extended advertisements provide a way to advertise more data than that allowed on the legacy advertisements.

The extended advertisements are particularly attractive for transmissions with larger payloads (e.g., sharing of neighbourhood information). In some embodiments, the nodes (robots) transmits beacons indicating on the primary advertising channels which are used by neighbouring nodes for downlink RSSI information in the neighbourhood. However, uplink RSSI information is sent on the secondary advertising channels. Extended advertisements also enable periodic exchange of information among neighbouring nodes.

Movement Phase

During the movement phase, a node performs two distinct types of movements. In case of coverage movement, a node performs movements in order to maximize overall coverage. During connectivity movement, a node performs movements to ensure connectivity for critical nodes.

Figure 8:
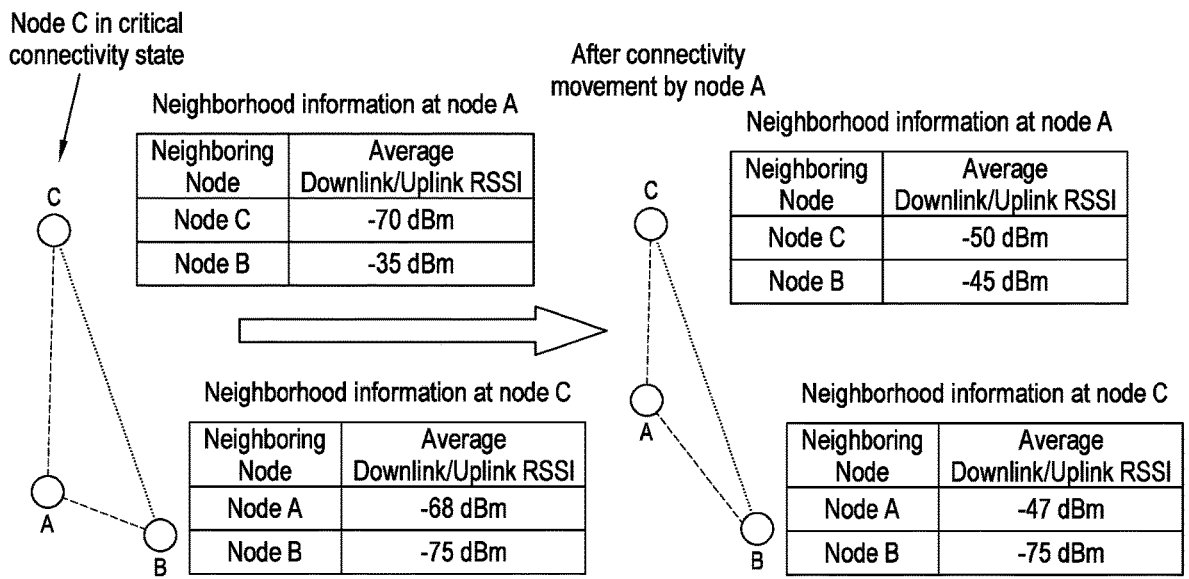
FIG. 8 illustrates a connectivity movement scenario according to an embodiment.

FIG. 8 illustrates the basic concept of connectivity movement. After the measurement phase, node C determines that it is in critical connectivity state. We assume that critical connectivity arises when the average RSSI of all the neighbours falls below a certain threshold RSSI_Neigh_Thresh. Therefore, node C transmits a critical connectivity message on the advertising channels. Node A receives the message transmitted by node C through scanning of advertising channels. Note that node A can also determine critical connectivity state of node C if the latter advertises its neighborhood information, i.e., node A exploits 2-hop connectivity information.

The neighborhood information of node C shows that it has two neighbors such that the RSSI of both is below RSSI_Neigh_Thresh. Node C should not move as its movement could affect the critical connectivity for other robots. Node A decides to perform connectivity movement to ensure better connectivity for node C. It transmits a connectivity movement message on the advertising channels. This message informs other nodes, or robots, (receiving critical connectivity message from node C or determining its critical connectivity state) of connectivity movement for node C. Note that node A has a neighboring node B with relatively good RSSI. To ensure connectivity in the neighborhood, connectivity movement by node A should not adversely affect connectivity with node B. Therefore, node A must move in a way that improves RSSI with node C while keeping RSSI with node B above RSSI_Neigh_Thresh. The connectivity movement algorithm is described later. Node A performs connectivity movement that ends critical connectivity state of node C without adversely affecting connectivity state with node B. FIG. 8 shows the neighborhood information at nodes A and C before and after connectivity movement by A.

In an embodiment, if node A cannot move sufficiently in order to remove the critical connectivity of C because of its connectivity to B, then another robot will move to improve the connectivity of C.

Connectivity Movement Algorithm

The connectivity movement algorithm leverages an angle-based control strategy aided by visual sensing (i.e., cameras) and wireless connectivity (as described earlier). If there is a capability of direction finding through wireless then that can be applied instead of the visual sensing. However, orientation information obtained via cameras is more practical.

Visual sensing can be achieved with multiple conventional (having limited field of view) cameras or a single omnidirectional/panoramic camera (providing 360° field of view). The objective of the angle-based control strategy is to provide navigation capabilities without solving the localization problem. While cameras do not readily provide range information, calculation of an image feature's bearing is a trivial task. Bearing refers to the absolute direction/angle of a landmark/robot in robot's frame of reference. In the proposed control strategy, other neighboring robots and/or some fixed environment features are used as landmarks. These landmarks correspond to points for which a robot can detect bearing and identify these points relative to its orientation. Based on the control strategy, the robots can reach any target position within the 2D-plane without range measurements and knowledge or computation of landmark coordinates. The only known information is the difference in bearing between the landmarks.

Figure 9:
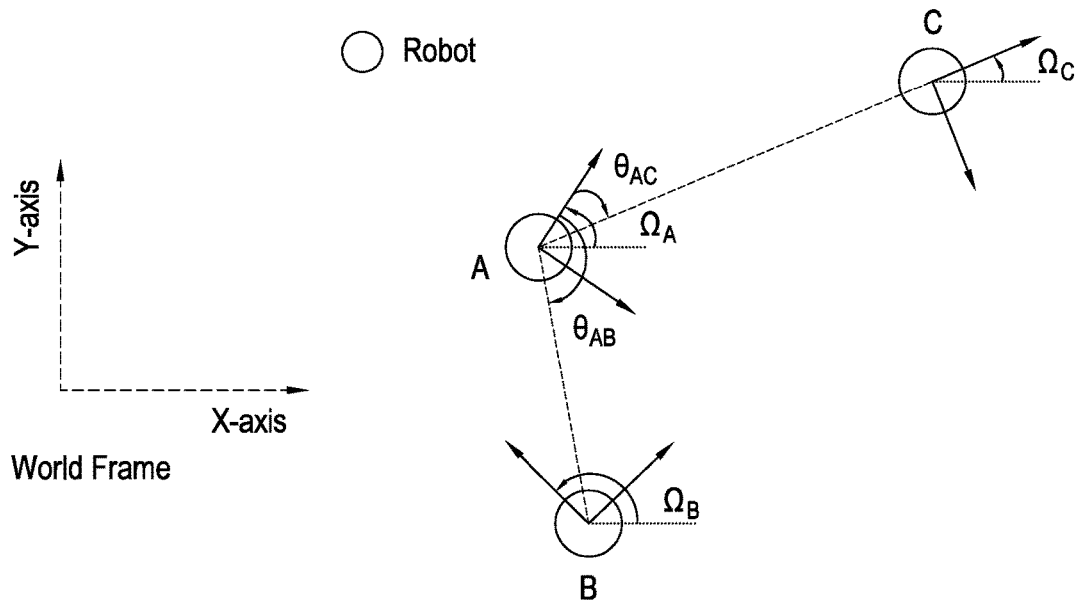
FIG. 9 illustrates orientation of robots in global and local frames of reference according to an embodiment.

FIG. 9 shows orientation of robots in global and local frames of reference. Let (x,y) represent the position of each robot in 2D-plane and $\Omega$ its orientation with respect to the world frame (global frame of reference). Each robot also has a local coordinate system attached to itself, i.e., the local frame of reference (robot frame). For instance, $\Omega_A$ denotes the orientation of robot A in the global frame whereas $\theta_{AC}$ denotes the orientation of robot C in robot A's local frame of reference.

Figure 10:
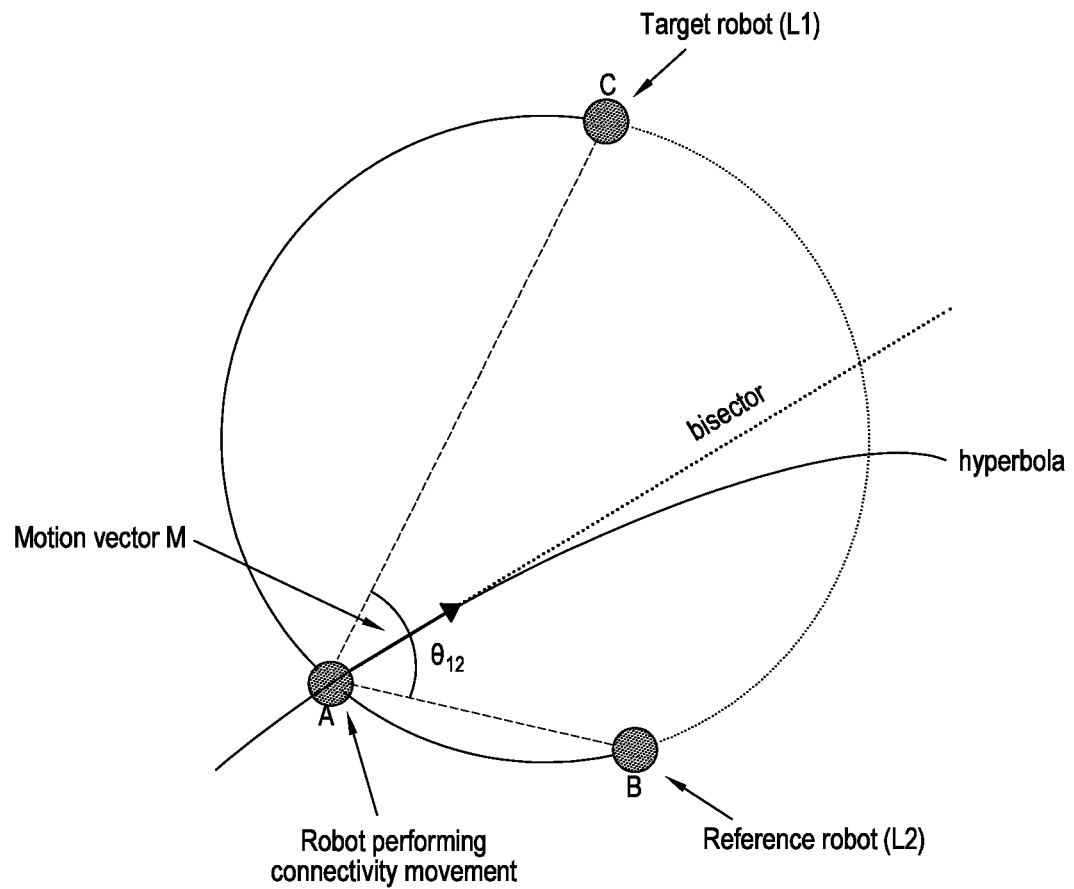
FIG. 10 illustrates connectivity movement with two landmarks according to an embodiment.

FIG. 10 illustrates the angle-based control strategy for the scenario of three nodes (shown in FIG. 8). This control strategy leverages two landmarks/features (such as robots) in the environment.

Initially, node/robot A determines that connectivity movement is required as node/robot C is in critical connectivity state. Robot A also has a neighbour with relatively good RSSI. We assume that both robot C and robot B are visible in robot A's field of view. Robot A selects these robots as landmarks L1 and L2 and transmits a connectivity movement message on the advertising channels. This message informs node B that it should maintain its current position as node A is using this as a landmark (L2) for connectivity movement. Note that node C is already maintaining its current position as it is in critical connectivity state. After this, node A computes the angular separation between the landmarks L1 and L2 as viewed from, or with reference to, node A, i.e., $\theta_{12}$. Based on the angular separation, robot A defines a motion vector M which dictates movement to a target position that ensures improves RSSI for robot C without adversely affecting connectivity with robot B. After moving to the new position, robot A transmits a movement complete message on the advertising channels.

The locus of positions that can observe landmarks L1 and L2 with angle ∠BAC (i.e., the angle between L1, L2 and A) is the circular arc with endpoints L1 and L2 that passes through A (as depicted by the solid circular arc in FIG. 10. Intuitively, the robot should move in the direction that increases the angular separation $\theta_{12}$. The motion vector M (the vector sign is omitted with M) is defined such that it lies on the bisector of the angle ∠BAC. The bisector of the angle ∠BAC is computed based on relative bearing of robots C and B in robot A's local frame of reference. Using FIG. 9, it can be computed as $(\theta_{AB}-\theta_{AC})/2$. The magnitude of the motion vector M is dictated by the angular separation and a target position computed by robot A based on an RSSI-distance mapping. It is given by $$M=\theta_{12}\cdot\delta_{12}\cdot d_{12}, -\pi\leq\theta_{12}\leq\pi$$

here $\delta_{12}$ is a unit length vector and $d_{12}$ the displacement for the target position.

From Euclidean geometry, it is known that the trajectory of a moving point following the bisector defined by an angle between two points is a section of the hyperbolic curve. In this case, this is the section going through hyperbolic curve with landmark points at its foci. Therefore, with landmarks, robot A can successfully navigate in 2D-plane such that it optimizes connectivity with robots B and C.

Figure 11:
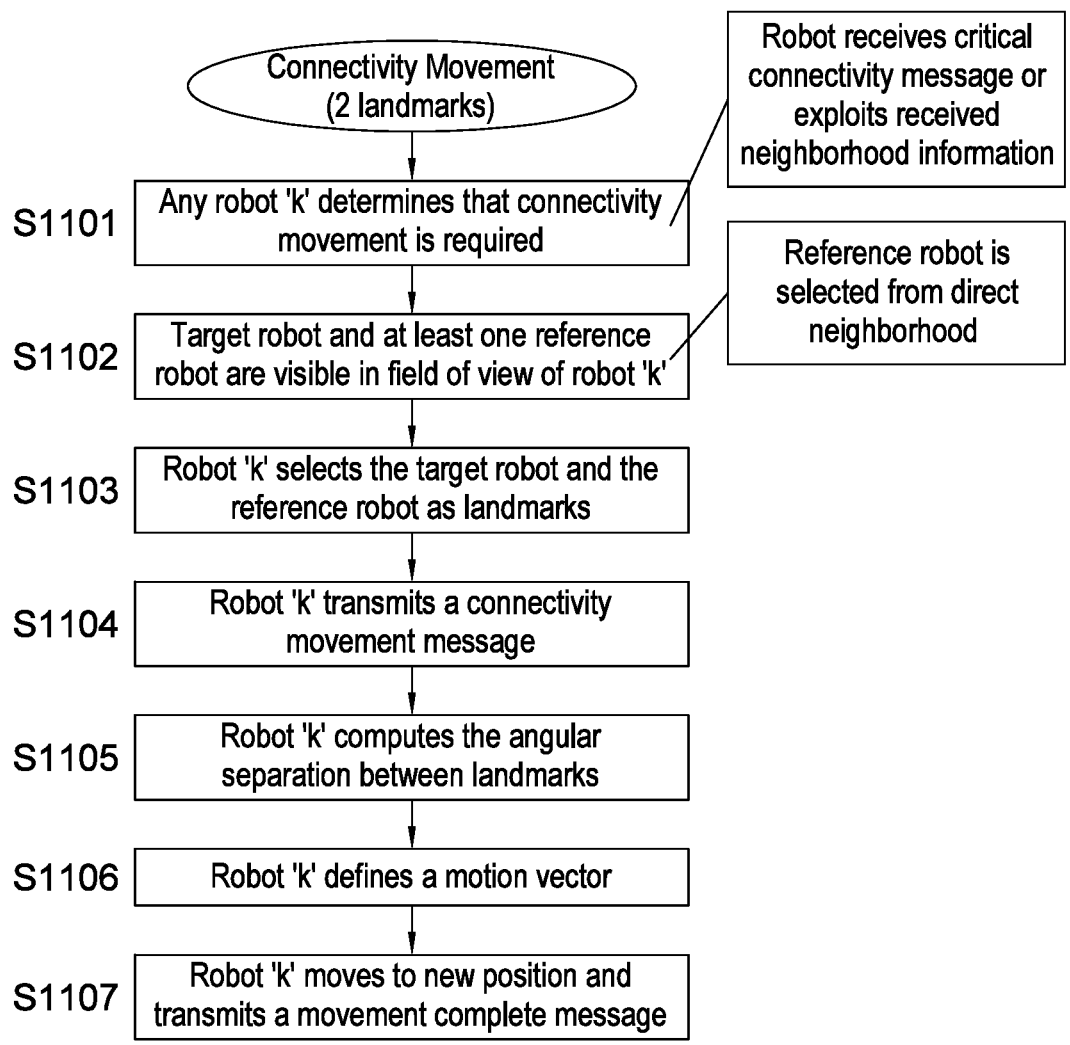
FIG. 11 is a flowchart detailing a method according to an embodiment.

FIG. 11 illustrates the connectivity movement algorithm for two landmarks. In S1101, a robot 'k' 101 determines that connectivity movement is required because a target robot is in a critical connectivity condition. In S1102, the robot 'k' 101 determines of the target robot and at least one reference robot are visible in field of view of the robot 101, and selects them as landmarks in S1103. The robot 'k' then sends a connectivity movement message to all robots 101 so that the reference robot maintains its position until the connectivity movement is complete (S1104).

The robot 'k' then computes the angular separation between the landmarks (S1105) and defines a motion vector based on the angular separation (S1106). The robot 'k' then moves to a new position based on the motion vector and send a movement complete message to the robots once it has finished the movement (S1107).

An angle-based control strategy is now explained for the scenario when the target robot (i.e., the robot in critical connectivity state) is not within the field of view of a robot that ascertains the need for connectivity movement. However, another robot has the target in its field of view.

Figure 12:
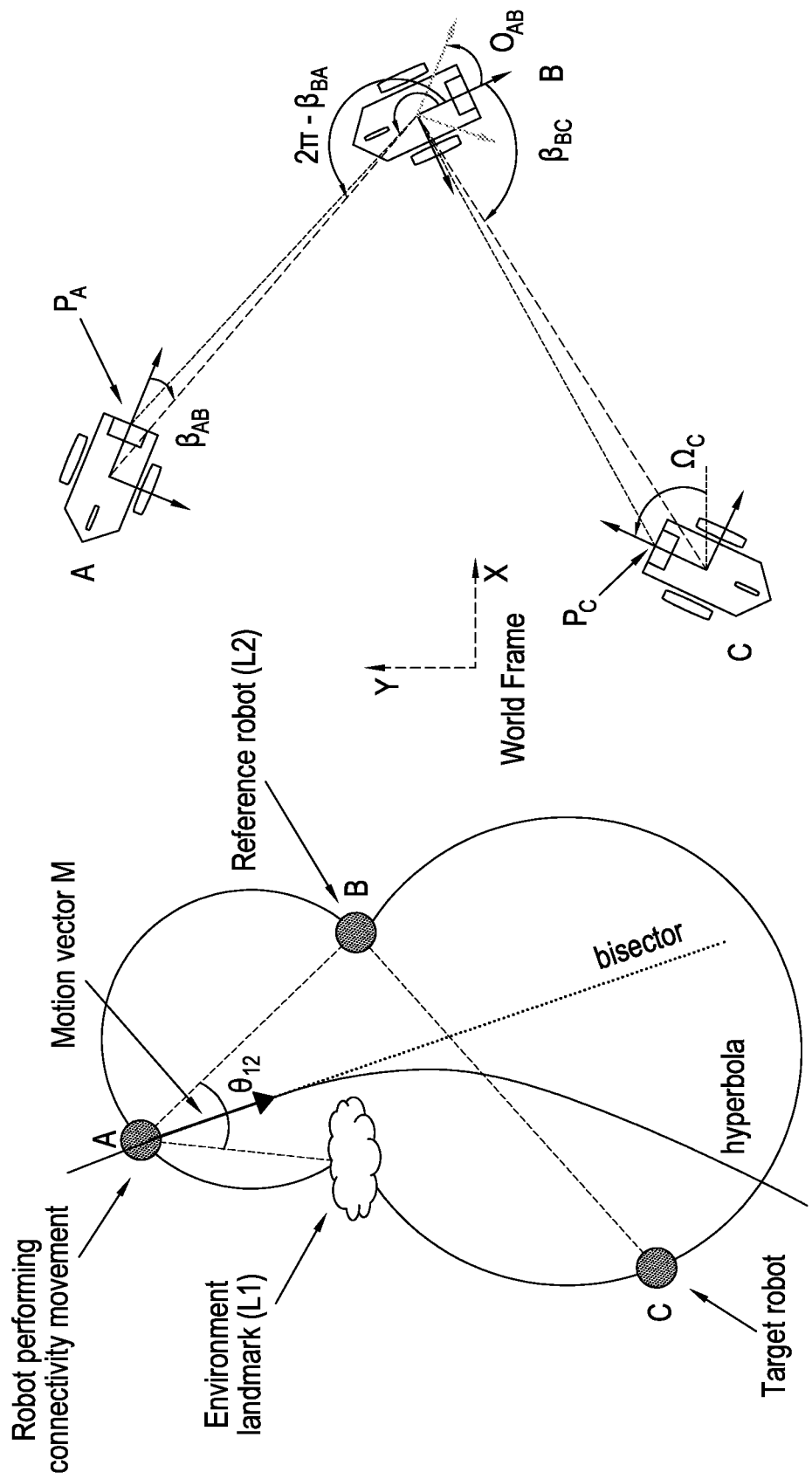
FIG. 12 illustrates connectivity movement with two landmarks, according to an embodiment, when the target robot is not visible.

FIG. 12 illustrates this scenario where robot A cannot see robot C as its field of view is obstructed, e.g., by an environment landmark (L1). However, robot B can see robot C in its field of view. Robot A transmits a locate robot message (on the advertising channels) in the neighborhood to find out if the target robot is visible to any other robot. In response to robot A's message, robot B transmits robot located message. It might be possible that the target robot is visible to more than one neighboring robots. In this case, robot A selects the best robot in terms of RSSI. After selecting robot B as a reference, robot A requests target robot's bearing information. The bearing information refers to direction of the target robot in reference robot's (i.e., robot B's) frame of reference. For instance, bearing of robot B in robot A's frame of reference is denoted by $\beta_{AB}$. Robot B transmits the bearing information (i.e., $\beta_{BC}$) of the target robot to robot A.

However, bearing information alone is not sufficient for robot A for estimating the position of the target robot with respect to the reference robot. Robot A also requires relative orientation information with the reference robot. The relative orientation is computed based on global as well as local frames of reference. Each robot may have a color marker (P) placed along its translational axis as illustrated in FIG. 12. Any robot can find the heading of a neighboring robot based on the marker. If the marker of robot B is visible to robot A, it computes the relative orientation information $O_{AB}$. However, if the marker is not visible, robot A requests relative orientation information from robot B. A robot may request bearing information from a robot requesting computation of relative orientation information. Once robot A has relative orientation information with the reference robot and the bearing information of the target robot, it selects landmarks and transmits a connectivity movement message. A robot makes a local decision for selecting appropriate landmarks. However, this can be communicated to selected robots through the underlying mesh network. Note that the robot A may or may not use the environment landmark depending on the position of robot C. For example, If the target robot is not obstructed, then the environment landmark is not used. Based on the angular separation between the landmarks as viewed from, or with reference to, robot A, i.e., $\theta_{12}$ robot A defines a motion vector M which dictates movement to a new position that ensures improved RSSI for target robot C without adversely affecting connectivity with robot B. The motion vector M is defined such that it lies on the bisector of the angle ∠BAL1 as described in the previous case. After moving to the new position, robot A transmits a movement complete message (on the advertising channels).

Figure 13:
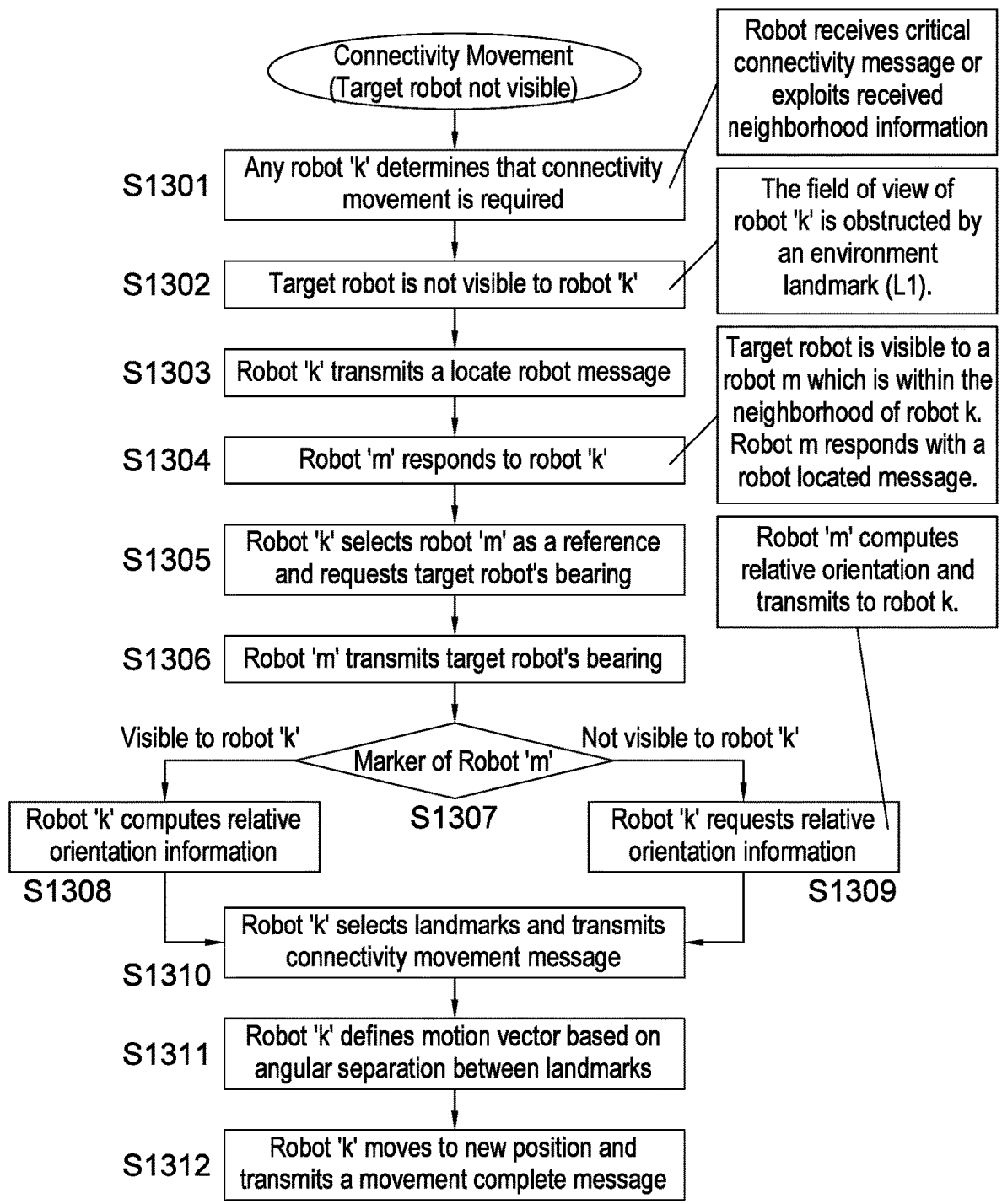
FIG. 13 is a flowchart detailing a method according to an embodiment.

FIG. 13 illustrates the connectivity movement algorithm for the above scenario. In S1301, a robot 'k' determines that connectivity movement is required because a target robot is in a critical connectivity condition. In S1302, the robot 'k' 101 determines that the target robot is not visible to the robot 'k' 101. Robot 'k' than sends a locate robot message to all the robots (S1303) and a robot 'm' responds (S1304) as the target robot is visible to robot Robot 'k' selects robot 'm' as a reference robot and requests the target robots bearing from robot 'm' (S1305). In S1306, robot 'm' sends the target robot's bearing to robot 'k'.

In S1307, the robot 'k' determines of the marker of robot 'm' is visible to robot 'k'. If it is, robot 'k' computes the relative orientation information (S1308). If the marker is not visible, robot k requests the relative orientation information (S1309). Robot 'k' then selects the landmarks and sends a connectivity movement message to all robots 101 so that the reference robot maintains its position until the connectivity movement is complete (S1310).

The robot 'k' then computes the angular separation between the landmarks and defines a motion vector based on the angular separation (S1311). The robot 'k' then moves to a new position based on the motion vector and sends a movement complete message to the robots once it has finished the movement (S1312).

The connectivity movement algorithm ensures that robot A can successfully navigate in the 2D-plane to optimize connectivity for a target robot C even if robot C is not visible in the field of view of robot A. By leveraging environmental landmarks and reference robots, successful navigation is possible for the sake of connectivity optimization.

With some simple analysis, it can be shown that the relative orientation between robots B and A, which is denoted by $O_{AB}$, is given by $$O_{AB} = \beta_{AB} + \beta_{BA} - \pi$$

Figure 14:
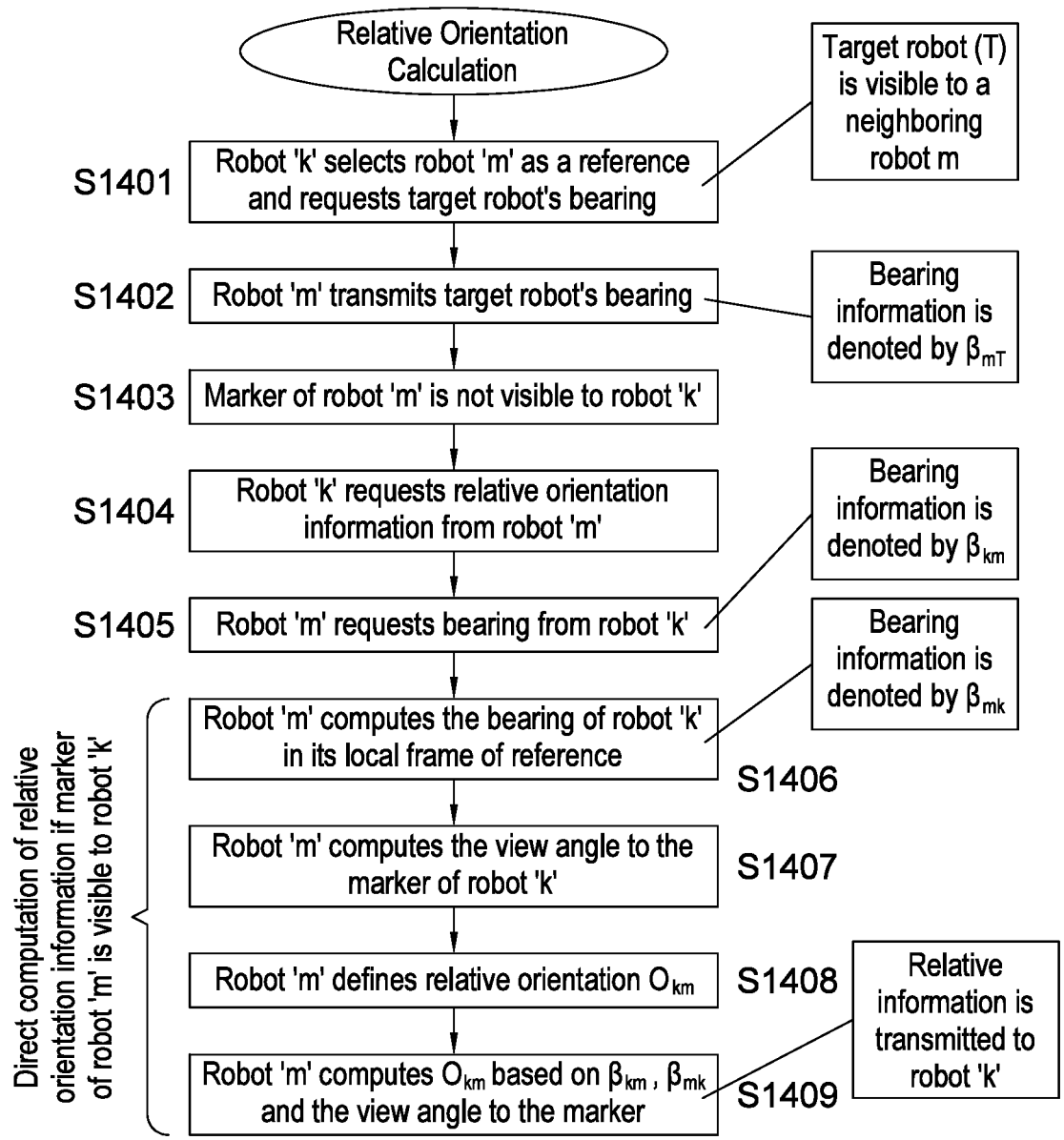
FIG. 14 is a flowchart detailing a method according to an embodiment.

FIG. 14 illustrates the complete algorithm for computation of relative orientation information. Note that the view angle to the marker is required for defining the relative orientation information $O_{AB}$.

In S1401, robot 'k' selects robot 'm' as a reference robot and requests the target robot's bearing. Then, in S1402, robot 'm' transmits target robot's bearing to robot 'k'. If the marker of robot 'm' is not visible to 'k' (S1403), then robot 'k' request the relative orientation information from robot 'm' (S1404).

In S1405, robot 'm' requests bearing information from robot 'k' Then robot 'm computes the bearing of robot 'k' in its local frame of reference (the frame of reference of robot 'm') (S1406). Robot 'm' computes the view angle to the marker of robot 'k' (S1407) and defines relative orientation information (S1408 and S1409).

Figure 15:
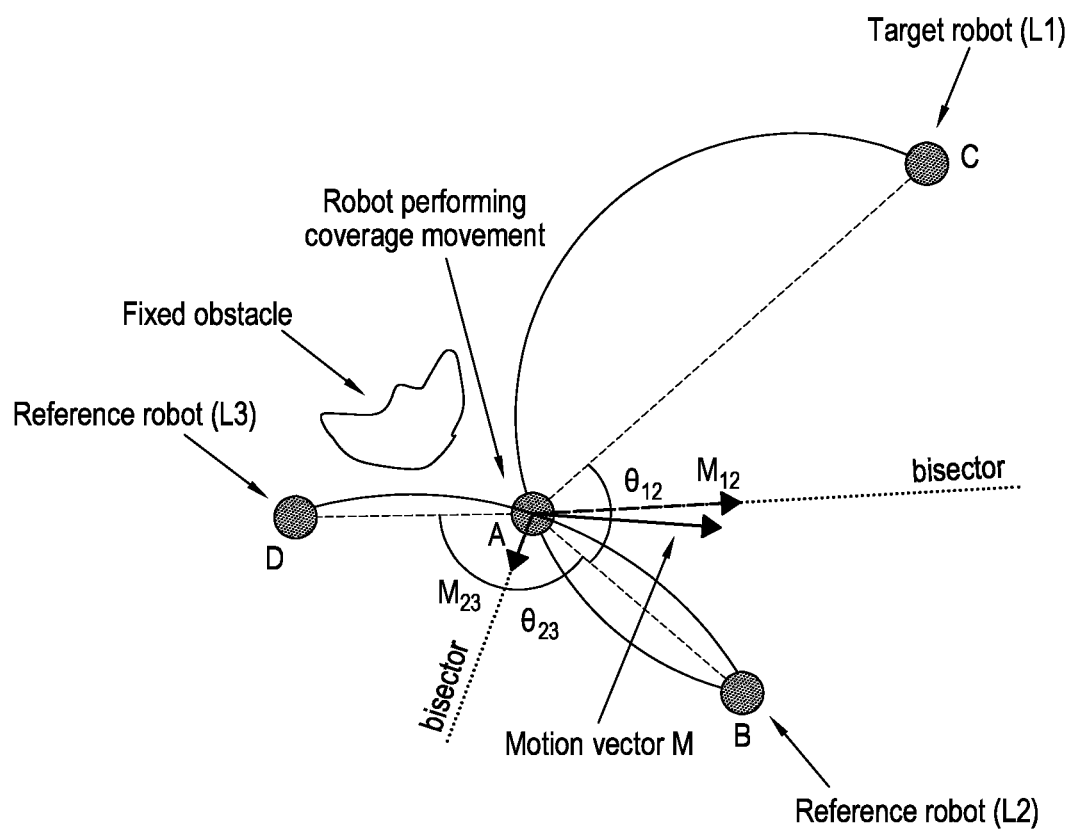
FIG. 15 illustrates connectivity movement for more than two landmarks according to an embodiment.

In some cases, a robot might be able to leverage more than two landmarks (environmental or robots). A robot might also be required to maintain robust connectivity with more than one neighboring robot while performing connectivity movement. This scenario is illustrated in FIG. 15 where robot A must ensure robust connectivity with robots B and D while performing connectivity movement for robot C which is in critical connectivity state. It is assumed that robots B, C and D are visible in robot A's field of view. Robot A selects robots B, C and D as landmarks and transmits a connectivity movement message. In this case, the angle-based control strategy dictates two separate motion vectors. Robot A computes the angular separation between landmarks (L1, L2) and (L2, L3), i.e., $\theta_{12}$ and $\theta_{23}$, respectively. Based on the angular separation, robot A defines partial motion vectors $M_{12}$ and $M_{23}$ that lie on the bisectors of angle $\angle BAC$ and $\angle DAB$, respectively. The overall motion vector M is the vector sum of all partial motion vectors $M_{12}$ and $M_{23}$.

The algorithm ensures that a robot can successfully navigate in 2D-plane with more than two landmarks that ensures simultaneous connectivity optimization with multiple reference robots. Note that there is a fixed obstacle in the environment in FIG. 15 that prohibits movement along this directions; hence, we have not defined motion vector $M_{13}$. If there was no obstacle, robot A would have defined a separate motion vector for landmarks (L1, L3).

Figure 16:
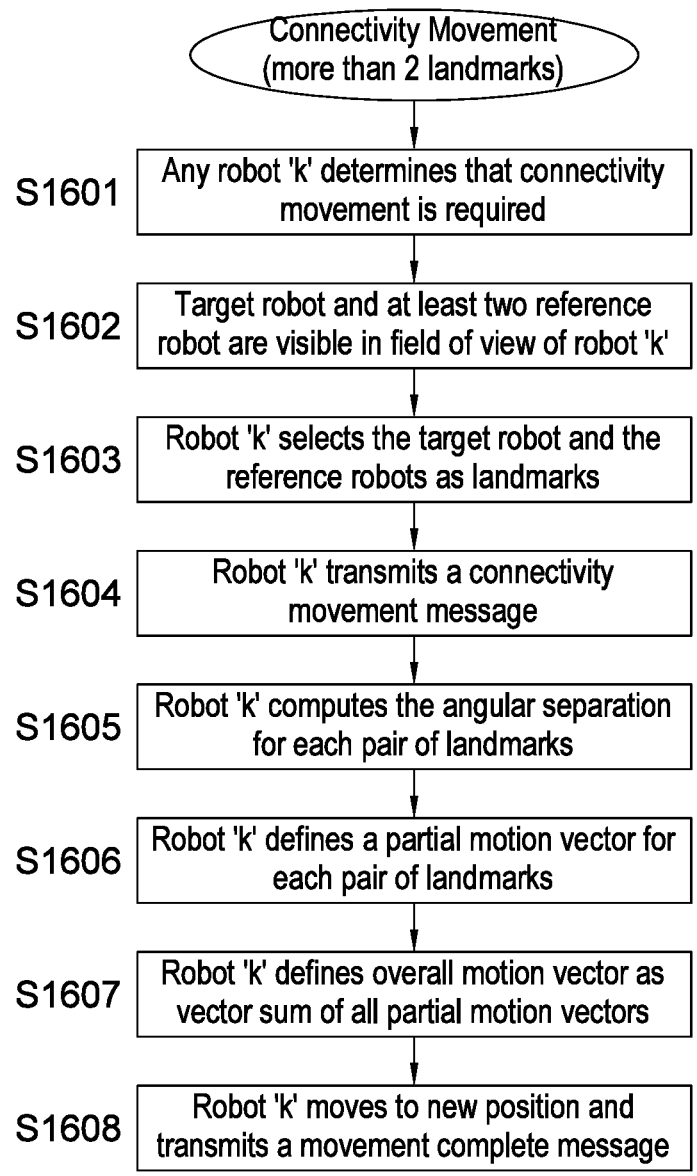
FIG. 16 is a flowchart detailing a method according to an embodiment.

FIG. 16 illustrates the connectivity movement algorithm for this scenario. In S1601, the robot 'k' determines that connectivity movement is required because a target robot is in a critical connectivity condition. In S1602, the robot 'k' 101 determines that the target robot and at least two reference robots are visible in the field of view of robot 'k' 101, and then robot 'k' selects them as landmarks in S1603. The robot 'k' then sends a connectivity movement message to all robots 101 so that the reference robots maintain their position until the connectivity movement is complete (S1604).

The robot 'k' then computes the angular separation for each pair of landmarks (S1605) and defines a partial motion vector based on the angular separation for each pair of landmarks (S1606). The robot 'k' then defines an overall motion vector as the vector sum of all partial motion vectors (S1607). The robot 'k' then moves to a new position based on the motion vector and send a movement complete message to the robots once it has finished the movement (S1608).

Robot 'k' than sends a locate robot message to all the robots (S1303) and a robot 'm' responds (S1304) as the target robot is visible to robot 'm'. Robot 'k' selects robot 'm' as a reference robot and requests the target robots bearing from robot 'm' (S1305). In S1306, robot 'm' sends the target robot's bearing to robot 'k'.

In S1307, the robot 'k' determines of the marker of robot 'm' is visible to robot 'k'. If it is, robot 'k' computes the relative orientation information (S1308). If the marker is not visible, robot k requests the relative orientation information (S1309). Robot 'k' then selects the landmarks and sends a connectivity movement message to all robots 101 so that the reference robot maintains its position until the connectivity movement is complete (S1310).

Coverage Movement Algorithm

Figure 17:
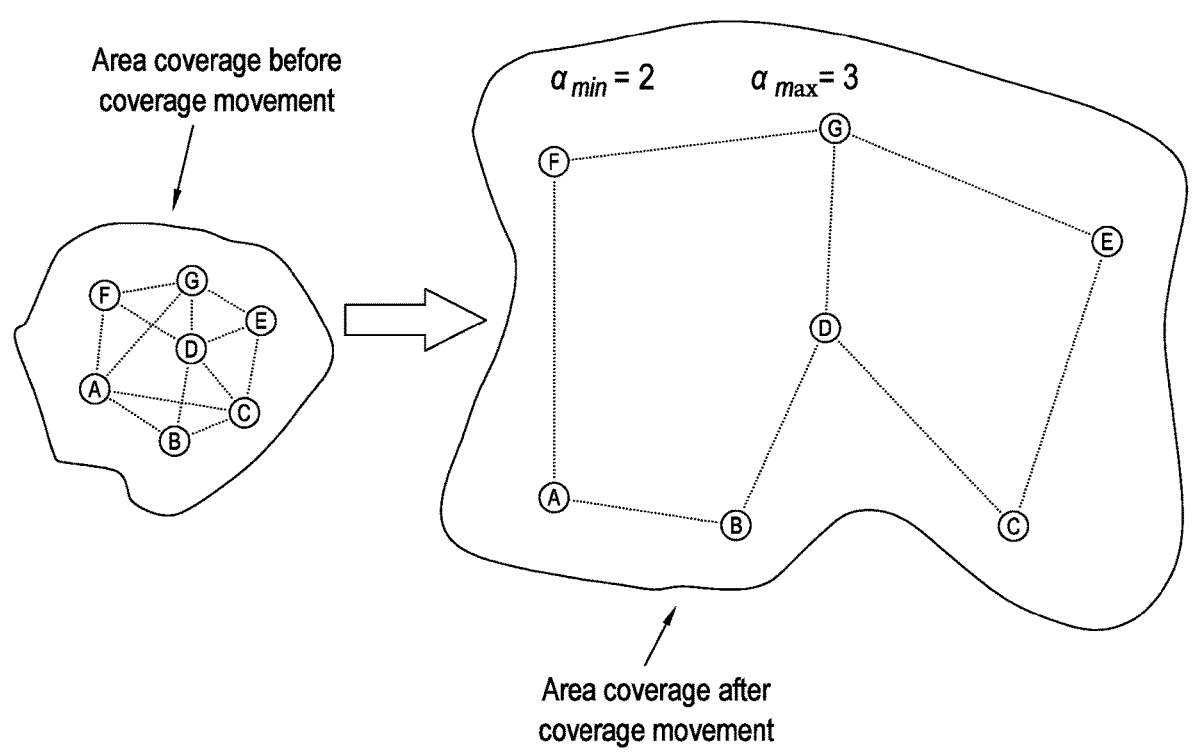
FIG. 17 illustrates a coverage movement scenario according to an embodiment.

The objective of coverage movement is to maximize overall area coverage while providing robust connectivity among robots. The optimization problem (1) aims to maximize the overall coverage subject to a maximum $\alpha_{max}$ neighbors per robot. The coverage movement follows a similar approach as the connectivity movement strategy described above. However, unlike connectivity movement, it optimizes overall coverage by minimizing the intersection of $A_i$, which is equivalent to maximizing the union of $A_i$. The coverage movement scenario is illustrated in FIG. 17. The union/intersection are in mathematical terms for the sake of optimization problem. Minimizing the intersection is dual of maximizing the union, i.e., coverage enhancement.

From FIG. 3A it can be noted that the nodes/robots perform either connectivity or coverage movement if the stability condition is not satisfied. The stability condition for a node i implies that $\alpha_{min} \leq |\mathcal{N}_i| \leq \alpha_{max}$ and the RSSI of each neighbor is above a certain threshold RSSI_Neigh_Thresh. The stability condition also implies that there is no requirement for connectivity movement for a node i in the neighborhood.

Figure 18:
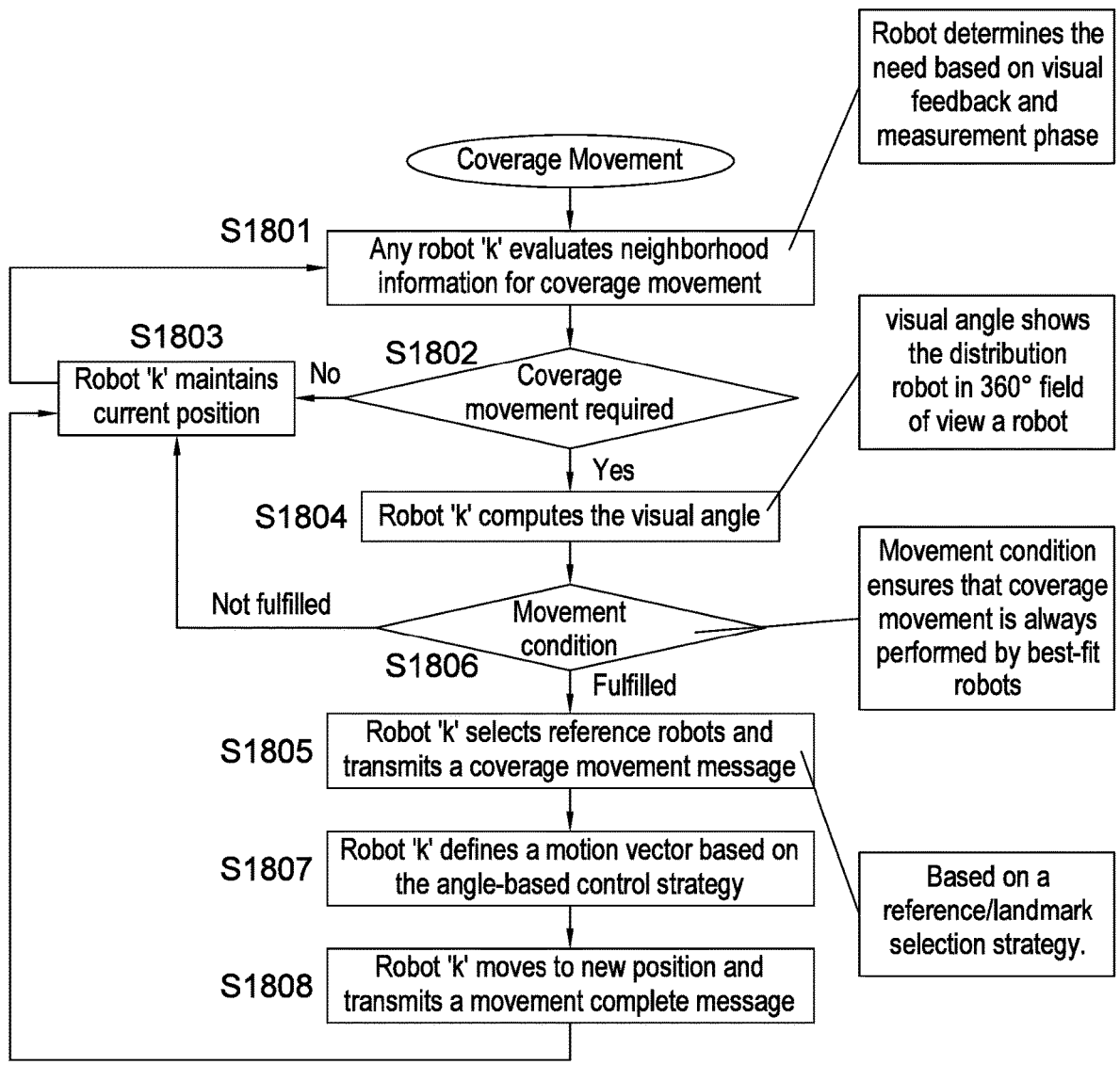
FIG. 18 is a flowchart detailing a method according to an embodiment.

FIG. 18 illustrates the coverage movement algorithm. Any robot evaluates its own neighborhood information for coverage movement. (S1801) A robot k determines that coverage movement is required if $|\mathcal{N}_k| > \alpha_{max}$, i.e. its number of neighbours exceeds a threshold value (S1802). If coverage movement is not required, then robot 'k' maintains its current position (S1803). However, this condition (if $|\mathcal{N}_k| > \alpha_{max}$) alone is not sufficient for coverage movement. At S1804, the robot 'k' also computes a visual angle that shows the distribution of robots in its 360° field of view. The visual angle is measured from the first robot to the last robot as shown in FIG. 19.

Figure 19:
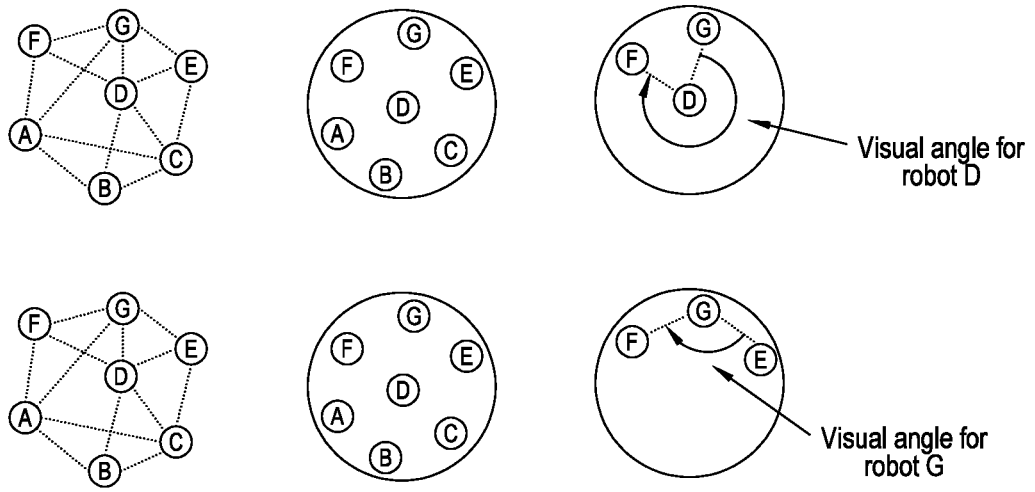
FIG. 19 illustrates visual angle computation for coverage movement according to an embodiment.

In FIG. 19, robot D has 6 robots in its field of view. Therefore, its visual angle, denoted by $\omega_D$, starts from robot G and ends at robot F. The visual angle for robot G, i.e., $\omega_G$ starts at robot E and ends at robot F as all the robots in its field of view are within this angle. The visual angle is important as it dictates the free space in which a robot can move. For example, coverage movement by robot D is far more constrained than robots A-C or E-G, because D is surrounded by a number of other robots. Based on the visual angle and RSSI measurements in the neighborhood, the following conditions for movement are defined:

Condition 3: Any robot k will perform coverage movement if the visual angle $\omega_k$ is lower than a threshold $\omega_{Thresh}$.

Condition 4: Any robot k will maintain its current position if condition 3 is satisfied and there are environment obstacles in its potential field of movement ($2\pi-\omega_k$).

At S1808, the robot check is the movement conditions are fulfilled. If they are not fulfilled, then robot 'k' maintains its current position (S1803). Once the movement conditions are fulfilled, the robot 'k' prepares for coverage movement (S1805). This entails selecting reference robots as landmarks. The reference robot selection strategy is based on the following conditions:

Condition 5: Any robot k selects the robots at the end points of the visual angle as reference (landmark) if the RSSI of all the neighboring robots within its field of view is above a certain threshold RSSI_Dense_Thresh.

Condition 6: Any robot k selects $\alpha_{max}$ robots as reference from the neighboring robots, in terms of best RSSI, while giving priority to robots using itself as a reference.

Condition 5 ensures rapid coverage enhancement under dense distribution of robots within a logistics facility. Condition 6 provides fine-tuned coverage enhancement in relatively sparse distribution of robots across a logistics facility. Each node also maintains a set of neighbors which are using itself as a reference. This information is acquired via scanning for coverage movement messages as described later. Based on condition 6, a robot selects $\alpha_{max}$ neighbors as reference. While selecting reference robots, a node gives priority to robots in the reference set. The reference robots are selected based on RSSI.

After selecting reference robots, a robot transmits a coverage movement message (S1805). The coverage movement message also contains information of selected reference robots. To ensure that multiple robot do not perform coverage movement at the same time, an advertising back-off parameter Adv_BO is used which introduces random delay before a robot transmits coverage optimization message on the advertising channels. The Adv_BO parameter provides further randomness in terms of access to advertising channels compared to native advertising techniques of Bluetooth mesh protocol. After transmitting coverage movement message, the robot defines a motion vector based on the angle-based control strategy (described previously in context of connectivity movement) (S1807).

At S1808, the robot 'k' moves to a new positon and transmits a movement complete message.

Figure 20:
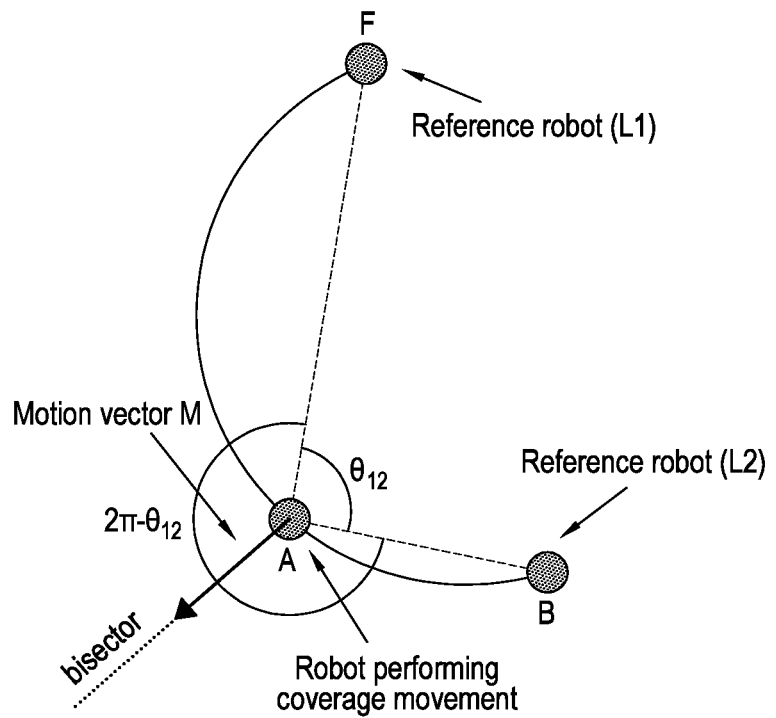
FIG. 20 illustrates coverage movement with two landmarks according to an embodiment.

In FIG. 20, robot A performs coverage movement using robots F and B as landmarks L1 and L2, respectively. The robot A computes the angular separation between landmarks, i.e., $\theta_{12}$. Unlike the connectivity movement scenario, the motion vector for coverage movement is defined such that lies on the bisector of the angle $2\pi-\theta_{12}$. In case of more than two reference robots, a robot performing coverage movement defines partial motion vectors for each pair of reference robots (as described previously). The overall motion vector is calculated as a vector sum of all partial motion vectors. Based on the motion vector, the robot moves to the new position and transmits a movement complete message.

Magnitude of Motion Vector

Figure 21:
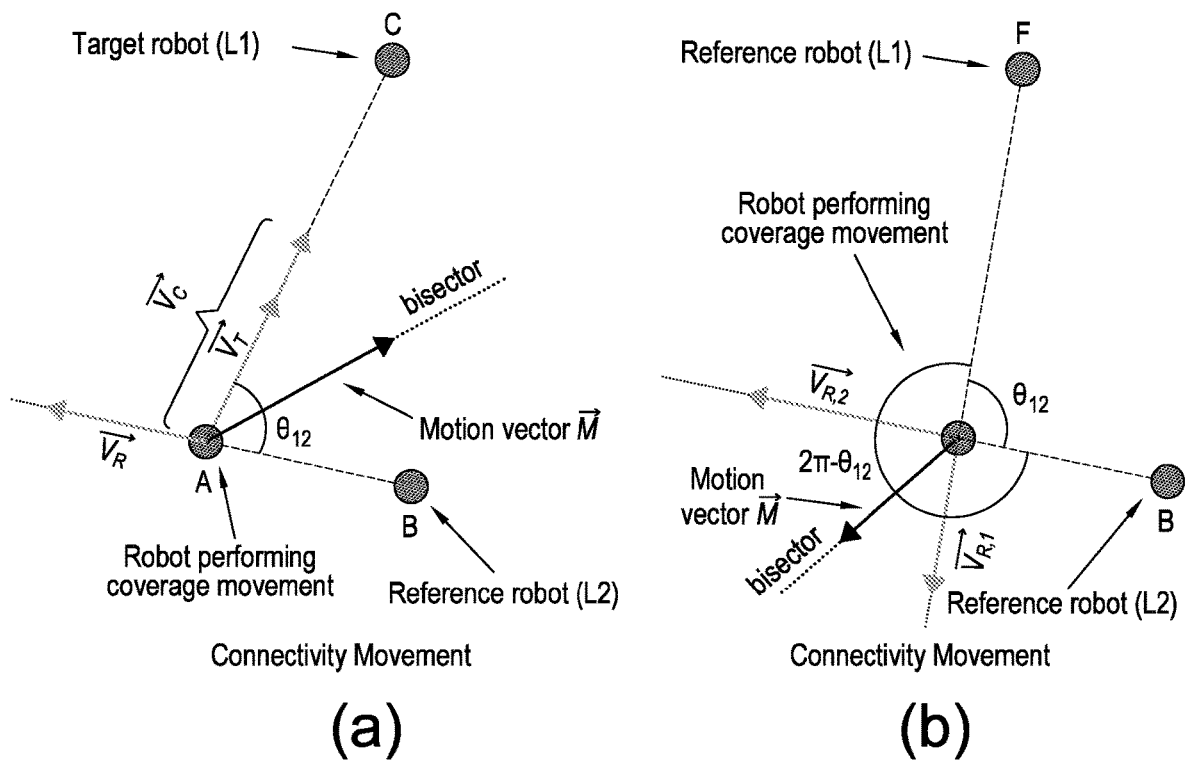
FIG. 21 illustrates magnitude computation of the motion vector in (a) connectivity and (b) coverage movement scenarios according to an embodiment.

A key aspect of connectivity and coverage movements is computation of the motion vector. From direction perspective, the motion vector lies on the bisector of the angle between the landmarks. The presented methods implement a unique approach for computation of the magnitude of the motion vector such that it fulfils the coverage/connectivity requirements. FIG. 21(a) and FIG. 21 (b) illustrate the proposed methods for determining the magnitude of the motion vector.

FIG. 21(a) illustrates a robot performing connectivity movement (i.e., robot A) aims to improve connectivity for a target robot (i.e., robot C) without adversely affecting its own connectivity with one (i.e., robot B) or more neighboring robots. A robot performing connectivity movement employs an RSSI-distance mapping, in order to get an estimate of the magnitude of required movement. Let $\vec{V}_T$ denote the vector in the direction of target robot. The magnitude of $\vec{V}_T$ is determined by the number of required distance units in order to improve RSSI. For example, if the average RSSI between robots B and C is −70 dBm then robot A should move a certain number of distance units toward C to improve the RSSI to −67 dBm (assuming that −67 dBm is the RSSI_Neigh_Thresh) At the same time, robot A can afford to move in opposite direction of robot B as the two have relatively robust link. Therefore, robot A defines a vector $\vec{V}_R$ in opposite direction to B. The magnitude of $\vec{V}_R$ is defined such that it reduces RSSI with robot B by a certain margin without adversely affecting link-level conditions. After defining vectors $\vec{V}_T$ and $\vec{V}_R$, robot A defines a scalar projection of $\vec{V}_R$ onto $\vec{V}_T$. This is given by $$\|\vec{V}_R\|\cos(\pi-\theta_{12}).$$

Based on the projection, robot A defines a new vector $\vec{V}_C$ (in the direction of $\vec{V}_T$) whose magnitude is the sum of the magnitude of $\vec{V}_T$ and the scalar projection of $\vec{V}_R$ onto $\vec{V}_T$, i.e., $$\|\vec{V}_C\|=\|\vec{V}_T\|+\|\vec{V}_R\|\cos(\pi-\theta_{12}).$$

Based on these vectors, robot A defines the magnitude of the motion vector $\vec{M}$ as a projection of $\vec{V}_C$ onto the bisector of the angle ∠BAC., i.e., $$\|\vec{M}\|=\|\vec{V}_C\|\cos(\theta_{12}/2)$$

Such a computation of magnitude vector ensures that robot A improves connectivity with the target robot (C) without adversely affecting its connectivity with robot B.

Computation of the magnitude of the motion vector in case of coverage movement follows a similar procedure. In case of FIG. 21(b), robot A is performing coverage movement by taking robots F and B as landmarks. Based on the RSSI of the links with robots F and B, robot A defines vectors $\vec{V}_{R,1}$ and $\vec{V}_{R,2}$ that dictate movement with a certain number of distance units (that ensure coverage expansion without disrupting connectivity) in opposite directions. Then the motion vector is defined as $$\vec{M}=\|\vec{V}_{R,1}\|\vec{V}_{R,2}+\|\vec{V}_{R,2}\|\vec{V}_{R,1}.$$

With some analysis, it can be easily proved that the motion vector lies on the bisector of the angle $2\pi-\theta_{12}$. The magnitude of the motion vector is given by $$\|\vec{M}\|=\|\vec{V}_{R,1}\|\cos(\theta_{12}/2)+\|\vec{V}_{R,2}\|\cos(\theta_{12}/2).$$

Let RSSI_Avg denote the average received RSSI at a robot. It estimates the distance using the following equation $$d_R=10^{(\gamma-RSSI\_Avg)/10n},$$

where γ is the received power at a reference distance (typically 1 meter) and n is the path loss exponent (based on the environment). A robot computes RSSI per distance units, i.e., $RSSI\_Avg/d_R$, which dictates distance units in a certain direction for improving RSSI or expanding coverage.

Note that the coverage optimization problem does not require sophisticated ranging techniques. Simple RSSI-based ranging techniques are fit for purpose. The accuracy of RSSI-based ranging can be further improved by various techniques which have been extensively investigated in literature.

Reactive Mode

Figure 22:
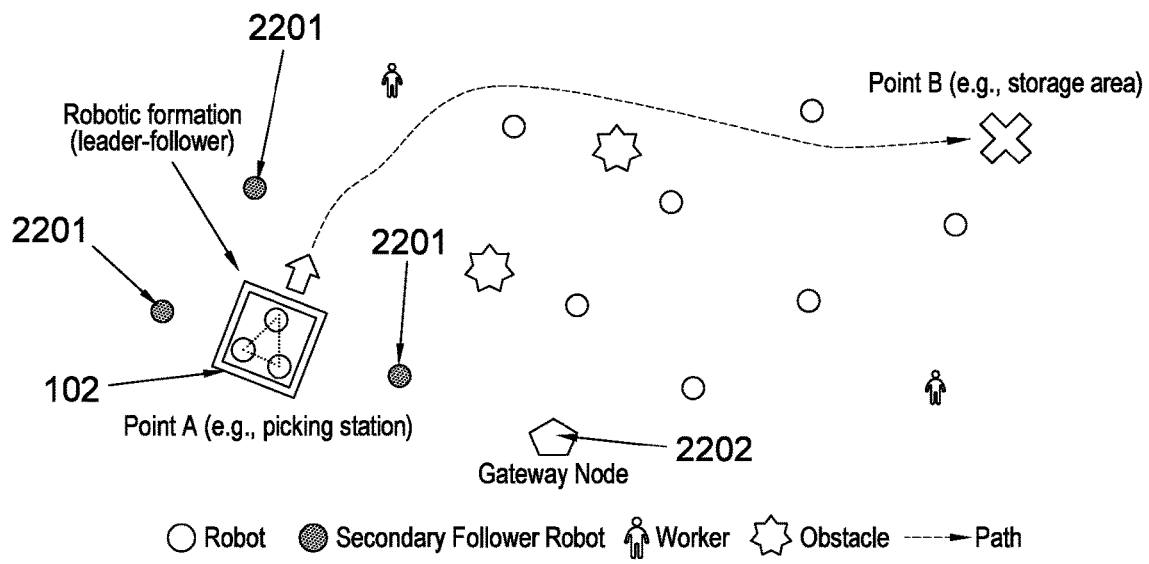
FIG. 22 illustrates a reactive mode of operation according to an embodiment.

FIG. 22 illustrates the reactive mode of operation. In the reactive mode, movement by a robotic formation 102 engaged in collective transport (or by a single robot engaged in transporting good etc.) triggers other mobile robots 101 in the network to meet certain coverage and connectivity constraints.

Figure 23:
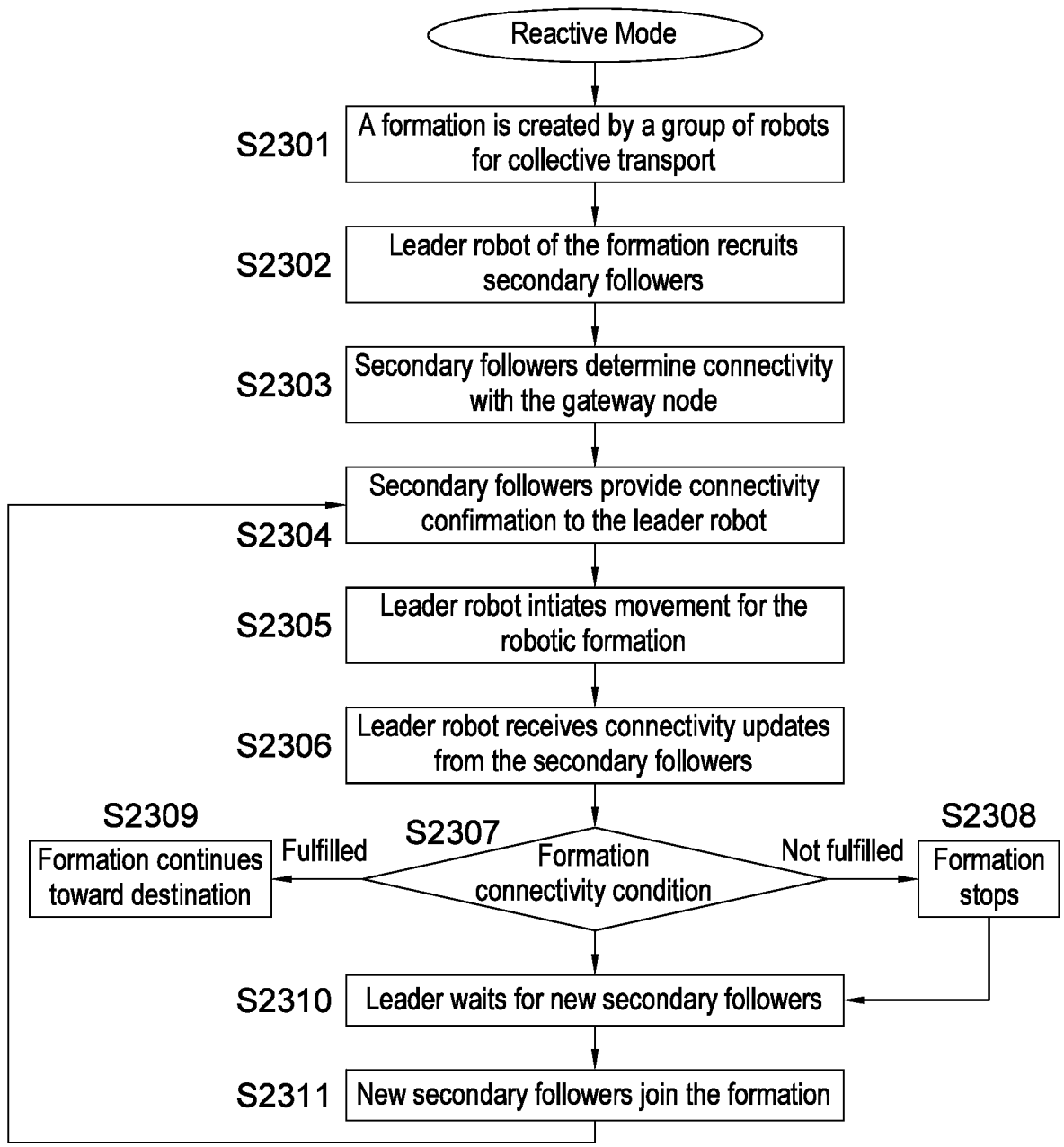
FIG. 23 is a flowchart detailing a method according to an embodiment.

FIG. 23 illustrates the method steps for the reactive mode of operation. Initially, a group of robots creates a formation 102 that includes one leader robot and multiple (primary) follower robots (S2301). Once a formation has been created, the leader robot recruits secondary followers 2201 (S2302). The leader robot transmits a secondary follower recruit message on the advertising channels. Any idle robot in the network that receives (by scanning the advertising channels) the leader's message can act as a secondary follower 2201. These secondary followers 2201 are not part of the formation itself. The role of secondary followers is to provide connectivity between the formation and a gateway node 2202 in the network. The gateway node 2202 is the controller which sends task information for all the robots. It is important that all robots remain connected to the gateway to receive task information or for functional safety reasons. The gateway node 2202 may be static (fixed, unmoving) or active (capable of movement, such as a robot). Depending on the shape of the formation 102, a leader robot recruits SF_max number of secondary follower robots. The secondary followers must have direct (one-hop) connectivity with the leader robot 102.

The gateway node 2202 in the network transmits beacons (with a hop_count value set to 0) on the advertising channels which are scanned by other nodes in the network. Based on the Bluetooth mesh protocol, a node (robot) relays the received beacons from the gateway node 2202 after incrementing the hop_count value by 1. Any secondary follower 2201 determines its connectivity with the gateway node 2202 based on the beacons from the gateway node 2202 (S2303). Robust connectivity to the gateway is ensured based on a gateway connectivity condition that entails a secondary follower receives (direct or relayed) beacons from at least two neighboring nodes (robots) with RSSI above a certain threshold RSSI_GWB_Thresh.

Each secondary follower 2201 provides connectivity updates to the leader (S2304). These updates follow either the normal advertising or the extended advertisement procedure. The leader robot initiates movement for the robot formation 102 (S2305) after receiving connectivity updates from the secondary follower. It receives regular connectivity updates from the secondary followers 2201 (S2306). The formation 102 continues toward its destination as long as the formation connectivity condition is satisfied (S2307). If not, the formation 102 stops (S2308) and the leader waits for new secondary followers 2201 to join the formation (S2310) as described later. The formation connectivity condition is not satisfied if a leader robot does not receive connectivity updates from any of the secondary followers 2201 over a certain number of scanning phases pertaining to normal or extended advertisements. The formation connectivity condition is also not satisfied if the leader receives a critical connectivity message or a movement constraint message from any of the secondary followers 2201. It is likely that a secondary follower 2201 is not able to follow the formation throughout its journey toward the destination point. This is because of battery lifetime restrictions or local coverage constraints in the neighborhood. Moreover, a secondary follower's 2201 connectivity status with the gateway node 2202 might change due to movement by other robots in the neighborhood.

If the formation connectivity condition is satisfied, the formation continues towards its destination (S2309).

Figure 24:
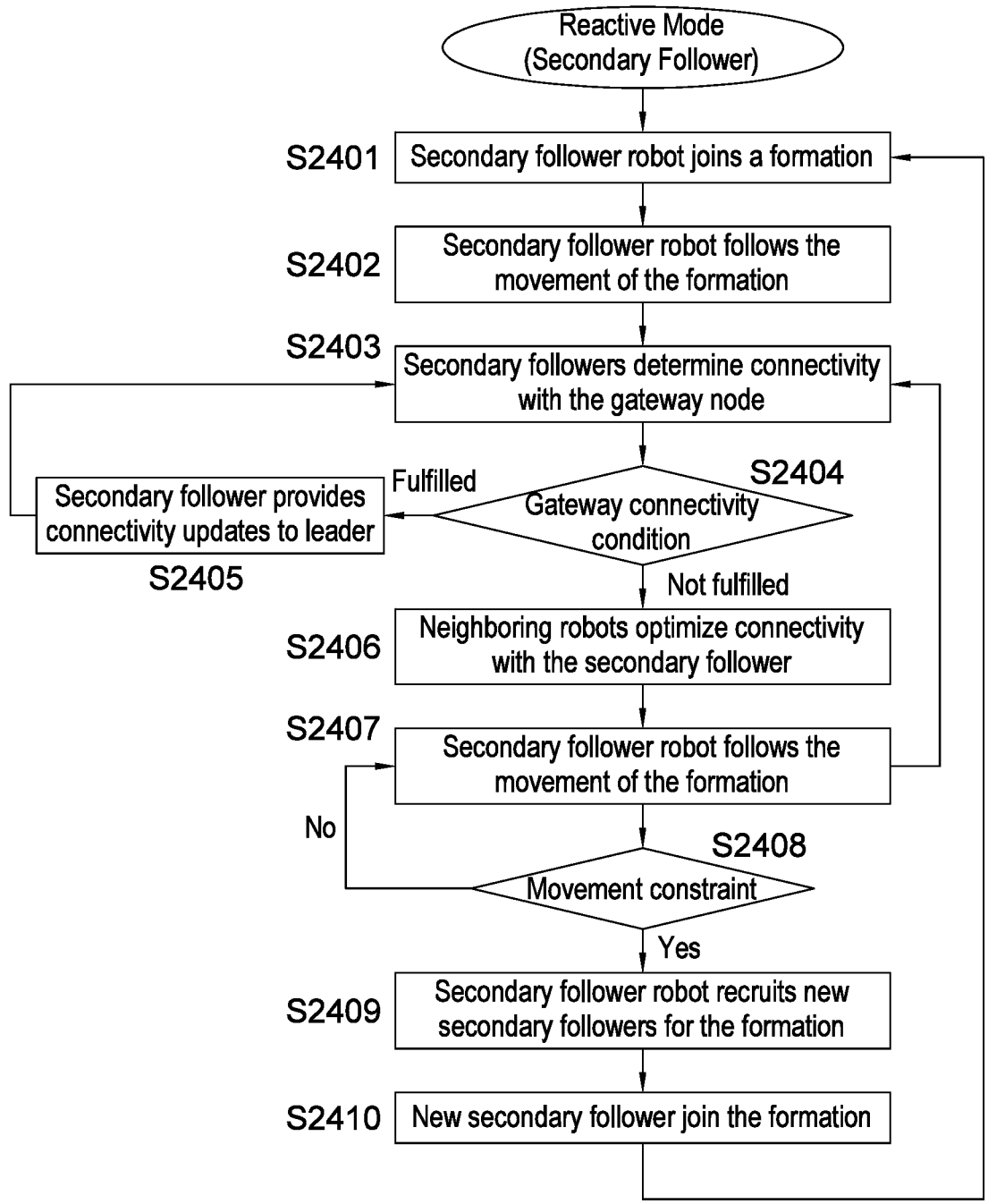
FIG. 24 is a flowchart detailing a method according to an embodiment.

FIG. 24 illustrates the method for a secondary follower 2201 operating in reactive mode. After joining the formation (S2401), a secondary follower follows the movement of the formation (S2402). Such movement tracking could be realized via visual sensing or trajectory information transmitted by the leader. The secondary follower regularly determines its connectivity status with the gateway node (S2403) based on the aforementioned gateway connectivity condition. If the gateway connectivity condition is not fulfilled (S2404), the secondary follower transmits a critical connectivity message in the neighbourhood for neighbouring robots to optimise connectivity with the secondary follower (S2406). Based on the critical connectivity message, the leader robot stops the formation. The critical connectivity message also triggers a connectivity optimization phase wherein neighboring robots perform connectivity movement to optimize connectivity with the secondary follower. Connectivity movement by a neighboring node follows a similar procedure as described previously for the proactive mode of operation.

In some cases, the secondary follower is not able to follow the formation anymore during its journey toward the destination (S2408). In such a situation, the secondary follower transmits a movement constraint message. Based on the movement constraint message, the leader robot stops the formation. The movement constraint message also triggers a new follower recruitment procedure (S2409). The secondary follower transmits its relative bearing information in the movement constraint message. This information assists neighboring robots to locate the secondary follower and the formation. Any neighboring robot which fulfils gateway connectivity condition is eligible to join the formation as a new secondary follower. To join the formation, a new secondary follower may perform connectivity movement procedure using the secondary follower or the formation itself and one or more reference robots as landmarks. This has been described previously in context of proactive mode of operation. Once a new secondary follower joins (S2410), the formation continues its journey toward the destination point.

Lack of Visual Sensing Capabilities

In case the robots are not equipped with visual sensing capabilities, radio direction finding techniques (e.g., angle of arrival or angle of departure which are available in Bluetooth 5.1) may be exploited. Such direction-finding techniques can also be used if there is a single landmark for navigation.

The above disclosed techniques and systems optimize wireless coverage in infrastructure-less logistics and warehousing operations. These methods and systems specifically address the challenges of infrastructure-less wireless connectivity. By leveraging off-the-shelf hardware and radios, the methods and systems achieve coverage optimization with completely distributed connectivity and control techniques without any requirement for maintaining global network state. The disclosed methods and systems achieve navigation without sophisticated ranging or localization techniques. Overall, the disclosed methods and systems provides a simple, pragmatic and scalable solution for coverage optimization in logistics facilities.

Furthermore, the disclosed methods and systems address the challenges of out-of-box robotics systems for logistics and warehousing applications. Some of the key structural differences of features of the disclosed methods and systems as follows.

Infrastructure-less Operation: Conventional techniques for coverage optimization rely on deployment of wireless access points or relays in logistic facilities. The disclosed methods and systems achieve coverage optimization through coordinated movement of mobile robots without relying on any communication infrastructure.

Local Network State: The disclosed methods and systems achieve coverage optimization through local sensing and communication among robots. There is no requirement for maintaining global network state at any node/robot in the network. This provides various simplifications from a system design perspective. The disclosed methods and systems implement a pragmatic approach for coverage optimization unlike most existing techniques which rely on simple broadcast models or tractable algorithms leveraging geometrical properties.

Distributed Connectivity and Control: The disclosed methods and systems do not require any centralized coordination from connectivity perspective. In some embodiments, it leverages Bluetooth mesh networking which is promising for addressing the challenges of mobile robotics systems in general and for coverage optimization in particular. Bluetooth mesh networking provides stateless and distributed multi-hop connectivity without any centralized coordination such as maintaining time synchronization in the network or a network-wide schedule for communication. The disclosed methods and systems can also be extended to Wi-Fi mesh-based connectivity. Moreover, the disclosed methods and systems do not leverage complex control architectures. Underpinned by distributed connectivity, the robots/nodes in the network make completely independent and distributed control decisions for coverage optimization. Such distributed connectivity and control aspects provide an overall scalable solution that provides transparent operation in dense as well as sparse deployments.

Navigation without localization: In practice, navigation is possible without solving the localization problem. The disclosed methods and systems achieve coverage optimization with a minimalist approach from a localization technology or infrastructure perspective. By leveraging vision-based sensing, distributed mesh connectivity and using mobile robots as landmarks, it implements an angle-based control strategy that provides optimized navigation capabilities without sophisticated ranging or localization techniques.

Dual-radio Connectivity: By leveraging a dual-radio connectivity approach, the disclosed methods and systems achieves coverage optimization without disrupting connectivity intra-formation connectivity for mobile robots engaged in collective transport. This ensures seamless material handling operations with optimized network-wide coverage.

In an embodiment, there may be provided a system comprising a plurality of robots, each robot comprising an optical sensor module, a microprocessor and a wireless communication module, each robot configured to perform the methods described previously.

While certain arrangements have been described, the arrangements have been presented by way of example only, and are not intended to limit the scope of protection. The inventive concepts described herein may be implemented in a variety of other forms. In addition, various omissions, substitutions and changes to the specific implementations described herein may be made without departing from the scope of protection defined in the following claims.

The invention claimed is:

1. A method for optimizing coverage of a wireless network of a plurality of mobile robots in an environment, wherein each robot comprises an optical sensor module, a microprocessor and a wireless communication module, the method comprising:
   receiving, by a first robot in the network, signals from a second robot in the network;
   determining, by the first robot based on the signals, that the first robot or second robot do not fulfil a network coverage condition;
   selecting, by the first robot, at least two landmarks in the environment; and
   performing, by the first robot, a movement based on an angle between the two landmarks with respect to the first robot, so as to improve the network coverage condition.

2. A method according to claim 1 wherein the movement is along a motion vector, wherein the direction of the motion vector lies on a bisector of the angle between the at least two landmarks with respect to the first robot.

3. A method according to claim 2 wherein a magnitude of the motion vector is based on a mapping between signal strength and distance.

4. A method according to claim 1 wherein the at least two landmarks comprise the second robot and a reference robot.

5. The method according to claim 1 wherein each robot comprises a camera.

6. A method according to claim 1, further comprising:
   prior to performing the movement, sending, by the first robot, a movement message to the robots in the network, the message including information on the at least two landmarks; and
   if the second robot or a reference robot is one of the at least two landmarks, maintaining, by the second robot or the reference robot, its position, until the movement is complete.

7. A method according to claim 1, wherein the network coverage condition comprises a connectivity condition, wherein the connectivity condition requires that an average strength of signals received by each robot in the network from neighbouring robots of that robot is above a threshold value, wherein the signals comprise connectivity information, the method further comprising:
   determining, by the first robot based on the connectivity information, that the second robot does not meet the connectivity condition with at least one neighbouring robot of the second robot; and
   performing, by the first robot, the movement based on the angle between the two landmarks with respect to the first robot, so as to improve the connectivity condition for the second robot while ensuring that the first robot meets the connectivity condition with neighbouring robots of the first robot.

8. The method according to claim 7 further comprising receiving, by the second robot, beacons from the at least one neighbouring robot;

determining, by the second robot, if it is in a critical connectivity state based on the strength of the received signals; and sending by the second robot, the information regarding the critical connectivity state.

9. The method according to claim 7 wherein the connectivity information from the second robot comprises neighbourhood information from the second robot.

10. The method according to claim 7, the method further comprising: wherein, if the second robot is not directly visible to a camera of the first robot, determining, by the first robot, a third robot as a reference robot, wherein the second robot is visible to the third robot;

receiving, by the first robot, from the third robot bearing information of the second robot, wherein the bearing information refers to a direction of the second robot in a frame of reference of the third robot;

determining relative orientation information between the first robot and the third robot; and selecting landmarks based on the bearing information and the relative orientation information.

11. The method according to claim 10 wherein each robot comprises a camera, the method further comprising:

if a marker of the third robot is visible to the camera of the first robot, computing, by the first robot, the relative orientation information; and if a marker of the third robot is not visible to the camera of the first robot, requesting, by the first robot relative orientation information from the third robot.

12. The method according to claim 10 further comprising:

sending, by the first robot, a message to all other robots to determine if the target robot is visible to any of the neighbouring robots.

13. A method according to claim 1, wherein the network coverage condition comprises a stability condition, the method further comprising determining, by the first robot, that a number of neighbouring robots of the first robot is greater than a threshold number;

computing, by the first robot, a visual angle that includes all robots in a 360 degrees field of view of the robot; and if the visual angle is less than a threshold value, performing by the first robot coverage movement based on the angle between the two landmarks within the environment, so as to reduce the number of neighbouring robots and to increase coverage of the network of robots.

14. The method according to claim 13 further comprising:

selecting, by the first robot, a reference robot to use as one of the at least two landmarks from the neighbouring robots of the first robot, wherein the reference robot is selected based on the signal strength of signals received by the first robot from the reference robot.

15. A method of maintaining wireless connection for a formation comprising robots of a plurality of the mobile robots and a leader robot from the plurality of robots, the formation configured to move an item in the environment, the method comprising:

determining, by a follower robot, in the environment, connectivity to a gateway node, wherein the follower robot is not comprised in the formation;

providing, by the follower, connectivity updates to the leader robot;

if a connectivity condition is satisfied initiating, by the leader robot, movement of the formation of robots towards a destination;

if the connectivity condition is not satisfied, performing by a neighbouring robot of the follower robot, the method of claim 1, wherein the neighboring robot is the first robot and the follower robot is the second robot;

wherein the connectivity condition is not satisfied if the leader robot does not receive connectivity updates from the follower robot over a predetermined period.

16. The method of claim 15 further comprising:

following, by the follower robot, the formation.

17. The method of claim 15 further comprising receiving by the leader robot a critical connectivity message or a movement constraint message from the follower robot; and recruiting, by the follower robot, a second follower robot, the second follower robot having a connection with the gateway node.

18. A robot comprising an optical sensor module, a microprocessor and a wireless communication module, the robot configured to perform the method of claim 1 as the first robot.

* * * * *